US008046465B2

(12) United States Patent  (10) Patent No.: US 8,046,465 B2
Ferguson et al.  (45) Date of Patent: *Oct. 25, 2011

(54) FLOW SCHEDULING FOR NETWORK APPLICATION APPARATUS

(75) Inventors: John C. Ferguson, Harvard, MA (US); Yevgeny Korsunsky, Waban, MA (US)

(73) Assignee: Crossbeam Systems, Inc., Boxborough, MA (US)

( * ) Notice: Subject to any disclaimer, the term of this patent is extended or adjusted under 35 U.S.C. 154(b) by 827 days.

This patent is subject to a terminal disclaimer.

(21) Appl. No.: 11/174,181

(22) Filed: Jul. 1, 2005

(65) Prior Publication Data

US 2006/0143499 A1 Jun. 29, 2006

Related U.S. Application Data

(63) Continuation of application No. 09/840,945, filed on Apr. 24, 2001, now abandoned.

(60) Provisional application No. 60/235,281, filed on Sep. 25, 2000.

(51) Int. Cl.
 *G06F 15/173* (2006.01)
(52) U.S. Cl. ........................................ 709/226; 709/229
(58) Field of Classification Search .................. 709/226
 See application file for complete search history.

(56) References Cited

U.S. PATENT DOCUMENTS

| | | | |
|---|---|---|---|
| 5,062,037 A | 10/1991 | Shorter et al. | |
| 5,134,691 A | 7/1992 | Elms | |
| 5,276,899 A | 1/1994 | Neches | |
| 5,446,680 A | 8/1995 | Sekiya et al. | |
| 5,522,070 A * | 5/1996 | Sumimoto | 718/104 |
| 5,557,742 A | 9/1996 | Smaha et al. | |
| 5,621,889 A | 4/1997 | Lermuzeaux et al. | |
| 5,675,797 A * | 10/1997 | Chung et al. | 718/104 |
| 5,771,234 A | 6/1998 | Wu et al. | |
| 5,774,668 A | 6/1998 | Choquier et al. | |
| 5,790,176 A | 8/1998 | Craig | |

(Continued)

FOREIGN PATENT DOCUMENTS

EP 0648038 12/1995

(Continued)

OTHER PUBLICATIONS

"ISR for PCT/US01/29885", related matter.

(Continued)

*Primary Examiner* — Tonia L. M. Dollinger
*Assistant Examiner* — Adam Cooney
(74) *Attorney, Agent, or Firm* — Strategic Patents, P.C.

(57) ABSTRACT

A method and system for distributing flows between a multiple processors. The flows can be received from an external source such as a network, by a front-end processor that recognizes the flow and the associated request, and identifies at least one internal applications processor to process the request/flow. The front-end processor utilizes a flow scheduling vector related to the identified applications processor(s), and the flow scheduling vector can be based on intrinsic data from the applications processor(s) that can include CPU utilization, memory utilization, packet loss, and queue length or buffer occupation. In some embodiments, applications processors can be understood to belong to a group, wherein applications processors within a group can be configured identically. A flow schedule vector can be computed for the different applications processor groups. In some embodiments, a control processor can collect the intrinsic applications processor data, compute the flow scheduling vectors, and transfer the flow scheduling vectors to the front-end processor.

14 Claims, 14 Drawing Sheets

U.S. PATENT DOCUMENTS

| | | | |
|---|---|---|---|
| 5,867,716 A | 2/1999 | Morimoto et al. | |
| 5,872,779 A | 2/1999 | Vaudreuil | |
| 5,975,945 A | 11/1999 | Daoud | |
| 5,978,843 A | 11/1999 | Wu et al. | |
| 6,006,264 A * | 12/1999 | Colby et al. | 709/226 |
| 6,014,700 A | 1/2000 | Bainbridge et al. | |
| 6,058,434 A | 5/2000 | Wilt et al. | |
| 6,064,723 A | 5/2000 | Cohn et al. | |
| 6,067,546 A | 5/2000 | Lund | |
| 6,088,804 A | 7/2000 | Hill et al. | |
| 6,092,218 A | 7/2000 | Liddell et al. | |
| 6,182,123 B1 | 1/2001 | Filepp et al. | |
| 6,226,700 B1 | 5/2001 | Wandler et al. | |
| 6,279,028 B1 | 8/2001 | Bradshaw, Jr. et al. | |
| 6,314,463 B1 * | 11/2001 | Abbott et al. | 709/226 |
| 6,317,775 B1 * | 11/2001 | Coile et al. | 709/226 |
| 6,321,338 B1 | 11/2001 | Porras | |
| 6,347,398 B1 | 2/2002 | Parthasarathy et al. | |
| 6,370,648 B1 | 4/2002 | Diep | |
| 6,393,569 B1 | 5/2002 | Orenshteyn | |
| 6,405,246 B1 | 6/2002 | Hutchison | |
| 6,411,986 B1 * | 6/2002 | Susai et al. | 709/203 |
| 6,430,570 B1 | 8/2002 | Judge et al. | |
| 6,442,599 B1 | 8/2002 | DuLac et al. | |
| 6,446,109 B2 | 9/2002 | Gupta | |
| 6,466,965 B1 * | 10/2002 | Chessell et al. | 709/203 |
| 6,519,703 B1 | 2/2003 | Joyce | |
| 6,578,066 B1 * | 6/2003 | Logan et al. | 718/105 |
| 6,597,684 B1 * | 7/2003 | Gulati et al. | 370/351 |
| 6,708,212 B2 | 3/2004 | Porras et al. | |
| 6,728,808 B1 | 4/2004 | Brown | |
| 6,735,206 B1 * | 5/2004 | Oki et al. | 709/226 |
| 6,769,066 B1 | 7/2004 | Botros et al. | |
| 6,816,903 B1 * | 11/2004 | Rakoshitz et al. | 709/226 |
| 6,999,952 B1 | 2/2006 | Pham | |
| 7,013,333 B1 * | 3/2006 | Skells | 709/226 |
| 7,023,825 B1 * | 4/2006 | Haumont et al. | 370/338 |
| 7,062,556 B1 * | 6/2006 | Chen et al. | 709/226 |
| 7,069,293 B2 | 6/2006 | Cox et al. | |
| 7,237,264 B1 | 6/2007 | Graham et al. | |
| 0,262,990 A1 | 10/2008 | Kapoor et al. | |
| 7,577,623 B2 | 8/2009 | Genty et al. | |
| 7,836,443 B2 | 11/2010 | Akerman et al. | |
| 2001/0003831 A1 * | 6/2001 | Boland | 709/226 |
| 2002/0165947 A1 * | 11/2002 | Akerman et al. | 709/223 |
| 2003/0051026 A1 | 3/2003 | Carter et al. | |
| 2004/0025044 A1 | 2/2004 | Day | |
| 2004/0225895 A1 | 11/2004 | Mukherjee et al. | |
| 2005/0076228 A1 | 4/2005 | Davis | |
| 2005/0081058 A1 | 4/2005 | Chang et al. | |
| 2006/0020595 A1 | 1/2006 | Norton et al. | |
| 2007/0192863 A1 | 8/2007 | Kapoor et al. | |
| 2008/0133517 A1 | 6/2008 | Kapoor | |
| 2008/0133518 A1 | 6/2008 | Kapoor et al. | |
| 2008/0134330 A1 | 6/2008 | Kapoor et al. | |
| 2008/0162390 A1 | 7/2008 | Kapoor et al. | |
| 2008/0229415 A1 | 9/2008 | Kapoor et al. | |
| 2008/0262991 A1 | 10/2008 | Kapoor et al. | |
| 2010/0042565 A1 | 2/2010 | Akerman | |

FOREIGN PATENT DOCUMENTS

| | | |
|---|---|---|
| EP | 0690376 | 3/1996 |
| WO | WO-2007070838 A2 | 6/2007 |
| WO | WO-2007070838 A3 | 6/2007 |

OTHER PUBLICATIONS

Lan, Youran "A Dynamic Central Scheduler Load Balancing Mechanism", *Computers and Communications, 1995, Conference Proceedings of the 1995 IEEE Fourteenth Annual International Phoenix conference in Scottsdale, AZ, USA*, (Mar. 28-31, 1995),734-740.

Mourad, Antoine "Scalable web Server Architectures", *Computers and Communications, 1997 Proceedings., Second IEEE Symposium in Alexandria, Egypt & Los Angeles, CA, USA*, IEEE Computer Society, US Jul. 1, 1997, pp. 12-16.

"U.S. Appl. No. 11/173,923, Non-Final Office Action mailed Jun. 23, 2008.", OARN,22 pgs.

TSAI, et al., "Complexity of gradient projection method for optimal routing in data networks", *IEEE Press, vol. 7, Issue 6*, (1999)897-905.

"U.S. Appl. No. 11/173,923), Non-Final Office Action mailed Feb. 19, 2009", 25 pgs.

"AU.S. Appl. no. 11/173,923, Final Office Action mailed Jan. 13, 2010" 32 Pgs.

"U.S. Appl. No. 11/173,923, Notice of Allowance mailed Sep. 7, 2010", 25.

"U.S. Appl. No. 11/610,296, Non-Final Office Action mailed Jun. 10, 2010", 16.

"U.S. Appl. No. 11/877,792, Non-Final Office Action mailed Mar. 12, 2010", 12.

"U.S. Appl. No. 11/877813, Non-Final Office Action mailed Mar. 11, 2010", Redundant to this case—same application. No. need to cite )pel) , 13.

"European Search Report", Application# 01971331.2 Jul. 28, 2010 , all.

"U.S. Appl. No. 11/877,819, Non-Final Office Action mailed Oct. 13, 2010", 22 pgs.

"U.S. Appl. No. 11/877,801, Non-Final Office Action mailed Oct. 12, 2010", 19 pgs.

"U.S. Appl. No. 11/877,813, Final Office Action mailed Nov. 17, 2010", 14.

Lee, "A framework for constructing features and models for intrusion detection systems ACM Transactions on Information and System Security (TISSEC)", vol. 3 , Issue 4 Nov. 2000 , 227-261.

Lei, J. Z. "Network intrusion detection using an improved competitive learning neural network", Communication Networks and Services Research , 2004 . Proceedings . Second, D Annual Conference on FREEERICTON May 19, 2004 , 190-197 pgs.

Huff, J. "Hierarchical Kohonenen Net for Anomaly Detection in Network Security", IE EE Transactions on Systems , Man and Cybernetics. Part B:Cybernetics , IEEE, Service Center, vol . 35 , No . 2, Apr. 1, 2005.

Debar, H. B. "A Neutral Network Component for an intrusion Detection System", IEEE Computer Society 1992 , 240.

Intl. Searching Authority, "PCT Search Report", for US Patent Application No. PCT/US06/62053 Jan. 26, 2008.

"U.S. Appl. No. 11/610,296, Final Office Action mailed Feb. 17, 2011", 14.

"U.S. Appl. No. 11/877,792, Non-Final Office Action mailed Mar. 14, 2011", 11.

"U.S. Appl. No. 11/926,292, Non-Final Office Action mailed Jul. 8, 2010", 17 Pgs.

"U.S. Appl. No. 11/926,311, Non-Final Office Action mailed Sep. 20, 2010", 8.

"U.S. Appl. No. 11/877,801, Final Office Action mailed Mar. 4, 2011", 15.

"U.S. Appl. No. 11/877,819, Final Office Action mailed Feb. 28, 2011", 19.

"U.S. Appl. No. 11/926,307, Non-Final Office Action mailed Jun. 23, 2010", 24 Pgs.

\* cited by examiner

FLOW SCHEDULING FOR NETWORK APPLICATION APPARATUS

CLAIM OF PRIORITY

This application claims priority to U.S. patent application Ser. No. 09/840,945, which was filed on Apr. 24, 2001, by Ferguson et al. for "Flow Scheduling for Network Application Apparatus", and which in turn claimed the benefit of U.S. Provisional Application Ser. No. 60/235,281, entitled "Optical Application Switch Architecture with Load Balancing Method", and filed on Sep. 25, 2000, naming Mike Ackerman, Stephen Justus, Throop Wilder, Kurt Reiss, Rich Collins, Derek Keefe, Bill Terrell, Joe Kroll, Eugene Korsunky, A. J. Beaverson, Avikudy Srikanth, Luc Parisean, Vitaly, Dvorkian, Hung Trinh, and Sherman Dmirty as inventors, the contents of which are herein incorporated by reference.

BACKGROUND OF THE INVENTION

(1) Field of the Invention

The present invention relates generally to increased efficiency of data flow processing, and more particularly to improved flow scheduling methods and systems for multiple processors.
basic structure for providing network services, however, is constrained with data transport dependencies. Unfortunately, a given service is often provided from a single network location that is deemed the central location for the service. This location may be identified by a destination internet protocol (IP) address that corresponds to a server that is capable of receiving and processing the request. Prior art systems attempt to ease the demand for a given service by providing a multiplicity of servers at the destination IP address, wherein the servers are managed by a content-aware flow switch. The content-aware flow switch intercepts requests for the application or service and preferably initiates a flow with a server that maintains a comparatively low processing load. The prior art systems therefore include methods for communicating a client request to a best-fit server, wherein the best-fit server can be identified using server metrics that include information related to the current load and recent activity of the servers, network congestion between the client and the servers, and client-server proximity information. In some systems, the distance between client and server can be great as measured geographically and/or via network hops, etc., and such information can be a factor in selecting the best-fit server. In some methods and systems, a obtaining server loading information includes a processing known as "pinging", a technique that can often be inaccurate.

There is currently not a system or method that provides accurate and reliable information regarding processor loading and other factors essential to determining a best-fit processor.

What is needed is a system and method that utilizes intrinsic rather than extrinsic data from a multiplicity of processors to determine an efficient algorithm for distributing flows to the processors.

SUMMARY OF THE INVENTION

The methods and systems of this invention provide a scalable architecture and method to facilitate the allocation of network services and applications by distributing the services and applications throughout a network such as the internet. In an embodiment, the methods and systems can be implemented using a switch architecture that can include applications processors that can execute applications and services according to subscriber profiles. In one embodiment, the applications processors utilize the LINUX operating system to provide an open architecture for downloading, modifying, and otherwise managing applications. The switch architecture can also include a front-end processor that interfaces to the network and the application processors, recognizes data flows from subscribers, and distributes the data flows from the network to the applications processors for applications processing according to subscriber profiles. In an embodiment, the front-end processors can recognize data flows from non-subscribers, and switch such data flows-to an appropriate destination in accordance with standard network switches. In one embodiment, the front-end processors include flow schedules for distributing subscriber flows amongst and between several applications processors based on existing flow processing requirements, including for example, policy.

In an embodiment, the applications processors and front-end processors can be connected to a control processor that can further access local and remote storage devices that include subscriber profile information and applications data that can be transferred to the front-end or applications processors. The control processor can further aggregate health and maintenance information from the applications and front-end processors, and provide a communications path for distributing health, maintenance, and/or control information between a management processor and the front-end and applications processors.

In an embodiment, the methods and systems disclosed herein can include the functionality of a switch that can be located at the front-end of a network of servers, while in another embodiment, the network apparatus may be between routers that connect networks.

In one embodiment, the front-end processors can be Network Processor Modules (NPMs), while the at least one applications processor can be Flow Processor Modules (FPMs). The control processor can include a Control Processor Module (CPM). In this embodiment, the NPMs can interface to a communications system network such as the internet, receive and classify flows, and distribute flows to the FPMs according to a flow schedule that can be based upon FPM utilization. The at least one FPM can host applications and network services that process data from individual flows using one or more processors resident on the FPMs. The CPM can coordinate the different components of the switch, including the NPMs and FPMs, allow management access to the switch, and support access to local storage devices. Local storage devices can store images, configuration files, and databases that may be utilized when applications execute on the FPMs.

In an embodiment, the methods and systems of the invention can also allow the CPM to access a remote storage device that can store applications and databases. An interface to at least one management server (MS) module can receive and aggregate health and status information from the switch modules (e.g., NPMs, FPMs, CPMs) through the CPMs. In one embodiment, the MS module can reside on a separate host machine. In another embodiment, the management server module functionality can be incorporated in a processor resident on a CPM.

In one embodiment, an internal switched Ethernet control bus connects the internal components of the switch and facilitates management and control operations. The internal switched Ethernet control bus can be separate from a switched data path that can be used for internal packet forwarding.

In an embodiment of the invention, the NPMs, the CPMs, the FPMs, and the interconnections between the NPMs, CPMs, and FPMs, can be implemented with selected redundancy to enhance the fault tolerant operations and hence system reliability. For example, in one embodiment wherein two NPMs, ten FPMs, and two CPMs can be implemented, the two NPMs can operate in redundant or complementary configurations. Additionally, the two CPMs can operate in a redundant configuration with the first CPM operational and the second CPM serving as a backup. The NPMs and CPMs can be controlled via the Management Server module that can determine whether a particular NPM or CPM may be malfunctioning, etc. In this same example, up to two FPMs can be identified as reserve FPMs to assist in ensuring that, in case of an FPM failure, eight FPMs can function at a given time, although those with ordinary skill in the art will recognize that such an example is provided for illustration, and the number of reserve or functioning FPMs can vary depending upon system requirements, etc. The illustrated FPMs can be configured to host one or more applications, and some applications can be resident on multiple FPMs to allow efficient servicing for more heavily demanded applications. Data flows entering the switch in-this configuration can be received from an originator, processed by a NPM and returned to the originator, processed by a NPM and forwarded to a destination, forwarded by a NPM to a flow processor and returned via the NPM to the originator, or forwarded by a NPM to a flow processor and forwarded by the NPM to a destination. In an embodiment wherein two or more NPMs are configured for complementary operation, a flow received by a first NPM may be processed, forwarded to a second NPM, and forwarded by the second NPM to a destination. In another embodiment, the first NPM can receive a flow and immediately forward the flow to the second NPM for processing and forwarding to a destination. In complementary NPM embodiments, FPM processing can also be included within the described data paths.

In an embodiment, the well-known Linux operating system can be installed on the FPM and CPM processors, thereby providing an open architecture that allows installation and modification of, for example, applications residing on the FPMs. In an embodiment, the NPMs can execute the well-known VxWorks operating system on a MIPS processor and a small executable on a network processor.

The methods and systems herein provide a flow scheduling scheme to optimize the use of the applications processors. In an embodiment, the applications processors can be understood as belonging to a group, wherein the applications processors within a given group are configured identically. Flow scheduling can be performed and adapted accordingly for the different groups.

In one embodiment, applications processors from a given group can report resource information to the control processors at specified intervals. The resource information can include intrinsic data from the applications processors such as CPU utilization, memory utilization, packet loss, queue length or buffer occupation, etc. The resource information can be provided using diagnostic or other applications processor-specific information.

The control module can process the resource information for the applications processor(s) of a given group, and compute a flow schedule vector based on the resource information, wherein in some embodiments, current resource information can be combined with historic resource information to compute the flow schedule vector. The flow schedule vector can be provided to the front-end processors and thereafter utilized by the front-end processors to direct flows to the various applications processors. For example, a front-end processor can identify a flow and the request associated therewith, identify the group of applications processors configured to process the flow/request, and thereafter consult a corresponding flow scheduling vector to determine that applications processor for which the flow/request should be directed for processing.

Other objects and advantages of the invention will become obvious hereinafter in the specification and drawings.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DESCRIPTION OF ILLUSTRATED EMBODIMENTS

Figure 1:
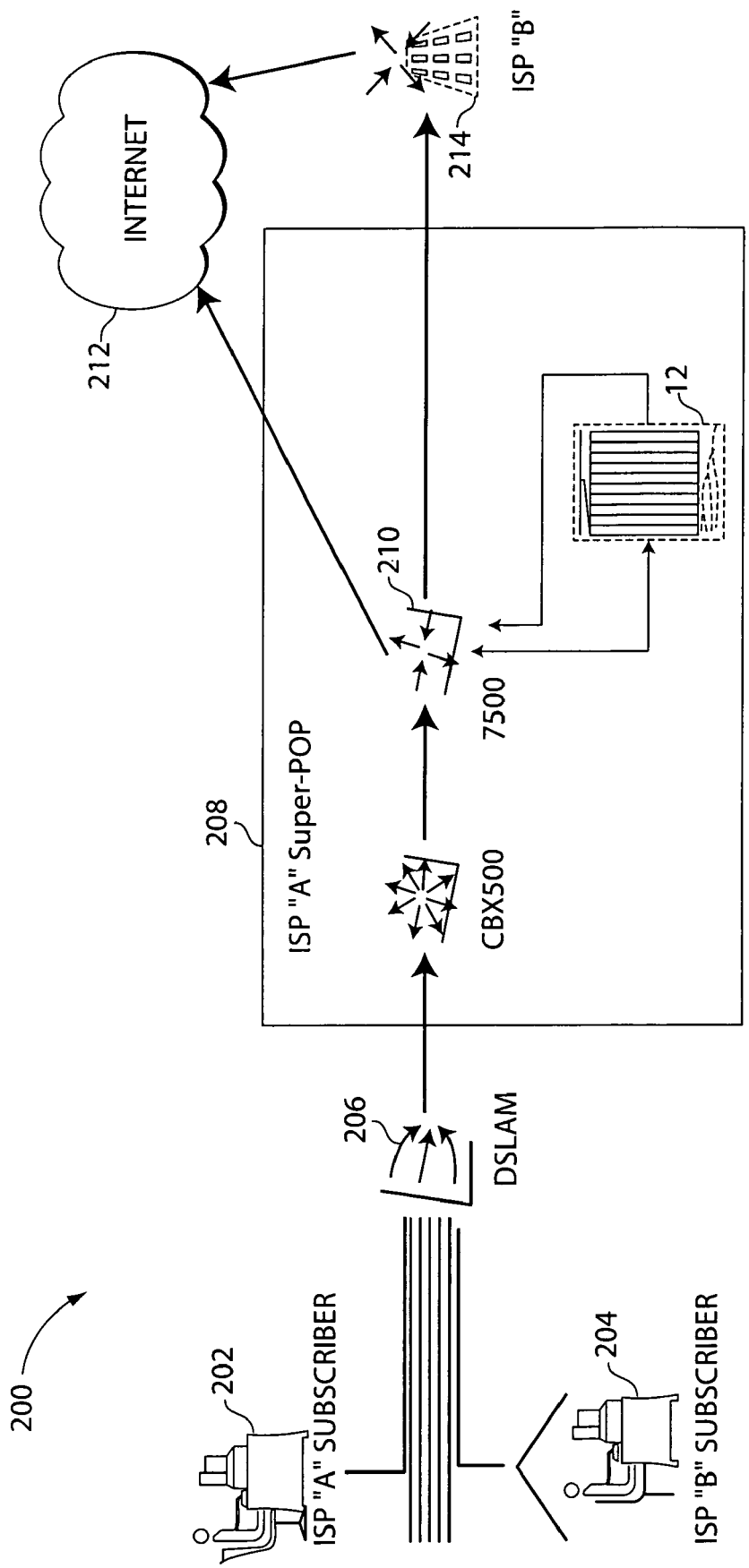
FIG. 1 shows an illustration of an edge-based firewall embodiment for the systems and methods disclosed herein.

To provide an overall understanding of the invention, certain illustrative embodiments will now be described; however, it will be understood by one of ordinary skill in the art that the systems and methods described herein can be adapted and modified to provide systems and methods for other suitable applications and that other additions and modifications can be made to the invention without departing from the scope hereof.

For the purposes of the disclosure herein, an application can be understood to be a data processing element that can be implemented in hardware, software, or a combination thereof, wherein the data processing element can include a number of states that can be zero or any positive integer.

For the purposes of the methods and systems described herein, a processor can be understood to be any element or component that is capable of executing instructions, including but not limited to a Central Processing Unit (CPU).

The invention disclosed herein includes systems and methods related to a network apparatus that can be connected in and throughout a network, such as the internet, to make available applications and services throughout the network, to data flows from subscriber users. Although the apparatus can perform the functions normally attributed to a switch as understood by one of ordinary skill in the art, and similarly, the apparatus can be connected in and throughout the network as a switch as understood by one of ordinary skill in the art, the apparatus additionally allows the distribution of applications throughout the network by providing technical intelligence to recognize data flows received at the switch, recall a profile based on the data flow, apply a policy to the data flow, and cause the data flow to be processed by applications or services according to the profile and/or policy, before forwarding the data flow to a next destination in accordance with switch operations as presently understood by one of ordinary skill in the art. In an embodiment, the next destination may be a network address or a another device otherwise connected to the network apparatus. By increasing the availability of services by distributing the services throughout the network, scalability issues related to alternate solutions to satisfy increased demand for applications and services, are addressed.

Four exemplary modes and corresponding illustrative examples of operation for the network apparatus or device are presented herein, wherein such modes are provided for illustration and not limitation. A first mode can be utilized for, as an example, a firewall application, wherein data flows can be received by the network apparatus and processed in what can otherwise be known as a "pass or drop" scenario. In such applications, the network apparatus can accept data flows from one interface and either pass the flow to a destination using a second interface according to permissions provided by the firewall, or the data flow may be dropped (i.e., not forwarded to the destination). In a second scenario, labeled "modify, source, and send," a data flow received by the network apparatus can be received by a first interface, modified, and forwarded via a second interface to a destination. An example embodiment of the second scenario includes content insertion. In a third scenario, the network apparatus can function as a proxy wherein data flows can be received, processed, and returned at a first data interface, and similarly, data flows received from a second data interface can be processed and returned via the second interface, wherein the respective data flows can be dependent or otherwise related. Sample embodiments of the third scenario include transaction services and protocol translation. In a fourth sample embodiment, the network apparatus can be utilized for applications including, for example, VoIP conferencing, content insertion, and application caching, wherein data flows can be received at a first interface, processed, and returned via the first interface.

FIG. 1 provides another illustration of the network apparatus and demonstrates a data flow for an edge-based firewall embodiment 200 incorporating the network apparatus according to the methods and systems disclosed herein. In the illustration, data flows in the form of internet requests from a subscriber to Internet Service Provider (ISP) A 202 and a subscriber to ISP B 204 are input to a Digital Subscriber Line Access Multiplexer (DSLAM) 206 and thereafter forwarded to an Asynchronous Transfer Mode (ATM) switch 208 within an ISP A-related Super-POP, that aggregates the flows and forwards the flows to a router 210. The router 210 directs the data flow traffic to the network device or apparatus 12 that recognizes the flows from the respective ISP subscribers 202, 204 and applies respective firewall policies. In the illustrated embodiment, ISPs A and B are subscribers to the network apparatus 12 and in accordance therewith, provide profiles and applications/services in accordance with such profiles for distribution and processing by the apparatus in conformance with the profiles. In the illustrated embodiment, applications in addition to the respective firewall policies, for example, can be applied to the respective data flows. After the respective processing is performed by the network apparatus 12, in the illustrated embodiment, the data flow from the ISP A subscriber 202 is forwarded to the internet 212 with the applications applied to the data, while the data flow from the ISP B subscriber 204 is forwarded to ISP B 214 with the policy applied to the data.

The network apparatus 12 can also recognize data as not otherwise belonging to a subscriber and therefore not eligible for applications processing, wherein such data can be switched to a destination in accordance with a switch presently known to one of ordinary skill in the art. Those with ordinary skill in the art will also recognize that although this disclosure presents the apparatus connected within the network known as the internet, the internet application is presented for illustration and not limitation. In an embodiment wherein the apparatus is used with a communications system such as the internet, the apparatus can be connected at the front-end of a server network, or alternately, between routers that connect networks, although the apparatus disclosed herein is not limited to such embodiments.

Figure 2:
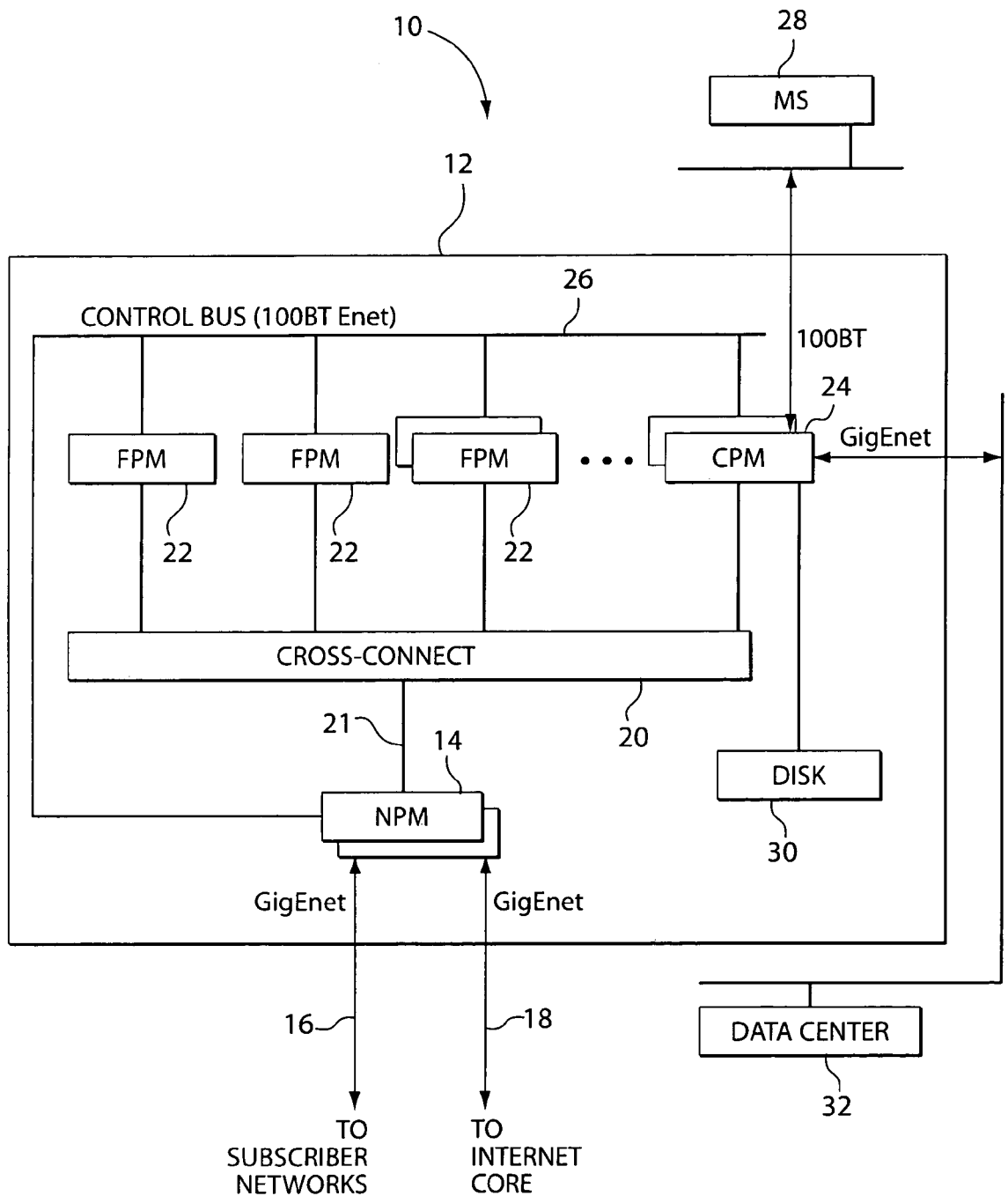
FIG. 2 is a block diagram of an apparatus according to the invention.

FIG. 2 shows another illustrative block diagram 10 of the network apparatus 12 that can host applications and connect into and throughout the infrastructure of a network such as the internet, thereby distributing the hosted applications and/or services accordingly throughout the network. Those with ordinary skill in the art will recognize that the FIG. 2 illustration is intended to facilitate the disclosure of the invention and is not intended as a limitation of the invention. As indicated by FIG. 2, the illustrated apparatus 12 includes two Network Processor Module (NPMs) 14 that facilitate the flow of network into and out of the network apparatus 12 by independently maintaining, in the illustrated embodiment, two Gigabit Ethernet connections. Those with ordinary skill with recognize that Gigabit Ethernet connections are merely one high-speed data link, and other such data links can be substituted without departing from the scope of the invention. In an embodiment where the apparatus 12 is inserted in-line on a trunk connecting subscribers to the internet core, for example, the Gigabit Ethernet connections can optionally interface to a subscriber network 16 and the internet core 18. Those with ordinary skill in the art will recognize that in another embodiment, a single NPM can be utilized, and the two Gigabit Ethernet connections can connect to two different networks, for example. Additionally, those with skill in the art will recognize that for the illustrated system, the apparatus 12 can utilize a single bi-directional interface to connect to the subscriber network 16 and internet core 18. The FIG. 2 NPMs 14 connect via an Ethernet through a cross-connect 20 to at least one Flow Processor Modules (FPMs) 22 that apply applications and services to data flows, and to at least one Control Processor Module (CPM) 24 that can process data flow requests and collect health and maintenance information from the NPMs 14 and FPMs 22.

Each illustrated NPM 14, FPM 22, and CPM 24 also connect to a high-speed switching fabric that interconnects all modules and allows internal packet forwarding of data flows between the NPM 14, FPM 22, and CPM 24 modules. The CPM 24 similarly independently connects to the FPMs 22 and NPMs 14 in the representative embodiment by a 100Base-T Ethernet Control Bus 26 that can be dual redundant internal switched 100 Mbyte/second Ethernet control planes. The illustrated CPMs 24 also connect to a Management Server (MS) module 28 by a 100Base-T Ethernet, to a local memory device 30, and to a Data Center 32 through a Gigabit Ethernet connection. The MS module 28 allows for data collection, application loading, and application deleting from the FPMs 22, while the local memory device 30 and Data Center 32 can store data related to applications or profile information. In the illustrated system of FIG. 2, there are two NPMs 14, at least two CPMs 24, and ten FPMs 22, although such a system is merely illustrative, and those with ordinary skill in the art will recognize that fewer or greater numbers of these components may be utilized without departing from the scope of the invention. In the illustrated system of FIG. 2, the two NPMs can operate in complementary or redundant configurations, while the two CPMs can be configured for redundancy.

As indicated, using an architecture according to the principles illustrated, the apparatus 12 may be placed within the normal scheme of a network such as the internet, wherein the apparatus 12 may be located, for example, at the front-end of a server network, or alternately and additionally, between routers that connect networks. Using firmware and/or software configured for the apparatus modules, the apparatus 12 can be configured to provide applications to subscribers, wherein the applications can include virus detection, intrusion detection, firewalls, content filtering, privacy protection, and policy-based browsing, although these applications are merely an illustration and are not intended as a limitation of the invention herein. In one embodiment, the NPMs 14 can receive data packets or flows and process such packets entirely before forwarding the packets to the appropriate destination. In the same embodiment, the NPMs 14 can receive and forward the packets to an appropriate destination. Also in the same embodiment, the NPMs 14 can recognize data packets that require processing that can be performed by applications residing on the FPMs 22; and in these instances, the NPMs 14 can perform flow scheduling to determine which FPM 22 can appropriately and most efficiently process the data, wherein the data packets or flow can then be forwarded to the selected FPM 22 for processing. In an embodiment, not all FPMs 22 can process all types of processing requests or data packets. Additionally, to process a data request, in some instances, a FPM 22 can require information from the local memory device 30 or the remote memory device 32, wherein the NPM 14 can direct the retrieval of storage data through the CPM 24 and thereafter forward the storage data to the FPM 22. An FPM 22 can thereafter transfer processed data to the NPM 14 for forwarding to an appropriate destination. With the apparatus 12 architecture such as that provided by FIGS. 1 and 3, application service providers can more efficiently provide services to subscribers by integrating and making available services throughout a network such as the internet, rather than at a single location that is often designated as a single IP address.

Figure 3A:
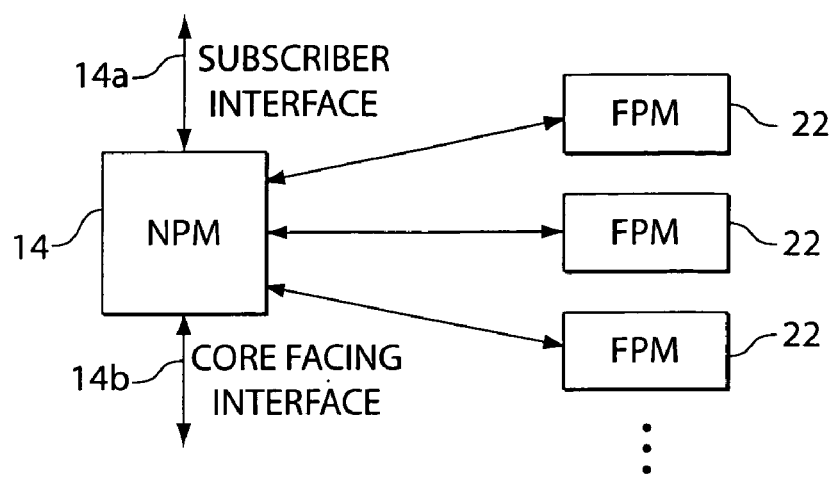
FIG. 3A is a block diagram of the basic data flow through the apparatus of FIG. 2.

FIG. 3A shows a schematic of data flow through the apparatus 12 of FIG. 1. As FIG. 3A indicates, NPMs 14 may provide an interface between the subscriber interface and the network core. The FIG. 3A NPM 14 can receive data from a first interface 14a, and depending on the data request, can process the data and transmit the processed data using either the first interface 14a or the second interface 14b. Alternately, the NPM 14 can forward the received data to a FPM 22 that can thereafter return the processed data to the NPM 14 for transmission or forwarding using either the first interface 14a or the second interface 14b. Similarly, the NPM 14 can receive data from the second interface 14b, process the data, and transmit the processed data using either the first interface 14a or the second interface 14b. Additionally, data received by the NPM 14 through the second interface 14b can be forwarded to the FPMs 22 for processing, wherein the FPMs 22 can return the processed data to the NPM 14 for transmission through either the first interface 14a or the second interface 14b. In another example, data received by the NPM 14 can be processed by multiple FPMs 22, wherein the data can be forwarded to the multiple FPMs 22 through the NPM 14, and returned to the NPM 14 for forwarding to a destination.

In an embodiment wherein two NPMs are configured for complementary operation, data received at a first NPM can be processed by the first NPM, transmitted to a second NPM, and forwarded by the second NPM to a destination. Alternately, data received at the first NPM can be forwarded to the second NPM, processed, and forwarded to a destination accordingly. In yet other scenarios, data received at either of the two NPMs can be forwarded to any of the FPMs 22, processed, and returned to either of the NPMs for forwarding to a destination. Those with ordinary skill in the art will recognize that the examples of data movement and processing entering, within, and exiting the apparatus 10 are merely for illustration and not limitation, and references to the first NPM and second NPM in the complementary embodiment can be exchanged, for example, without departing from the scope of the invention.

Figure 3B:
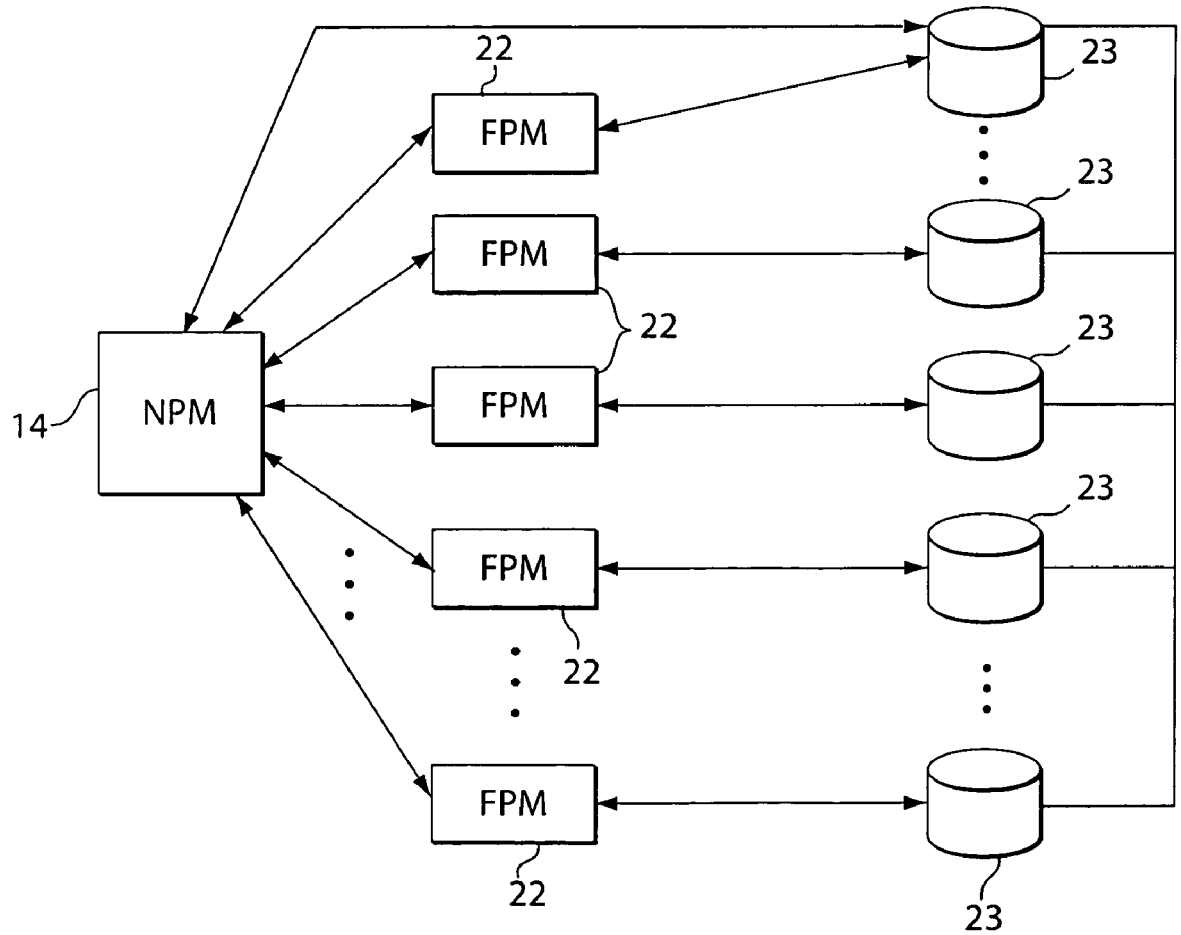
FIG. 3B is a block diagram of a storage area network embodiment for the apparatus of FIG. 2.

FIG. 3B shows the system of FIGS. 2 and 3A configured to operate in accordance with a Storage Area Network (SAN) as is commonly known in the art. In the configuration of FIG. 3B, the NPM 14 and FPM 22 integration as indicated in FIG. 3A is preserved, however, the NPM 14 and FPM 22 also maintain interfaces to one or more storage devices 23 that can be any storage device commonly known in the art, including but not limited to RAM, ROM, diskettes, disk drives, ZIP drives, RAID systems, holographic storage, etc., and such examples are provided for illustration and not limitation. As FIG. 3B indicates, data can be received at the NPM 14 and transferred directly to the storage devices 23; or, data received by the NPM 14 can be forwarded to one or more FPMs 22 before being forwarded by the FPMs 22 to the storage devices 23, wherein the FPMs 22 can perform processing on the data before forwarding the data to storage 23. Similarly, in the FIG. 3B configuration, data can be retrieved from storage 23 by either the NPM 14 or FPMs 22. In the FIG. 3B configuration, the NPM 14 and FPMs 22 maintain external interfaces that can accommodate data input and output.

Figure 4:
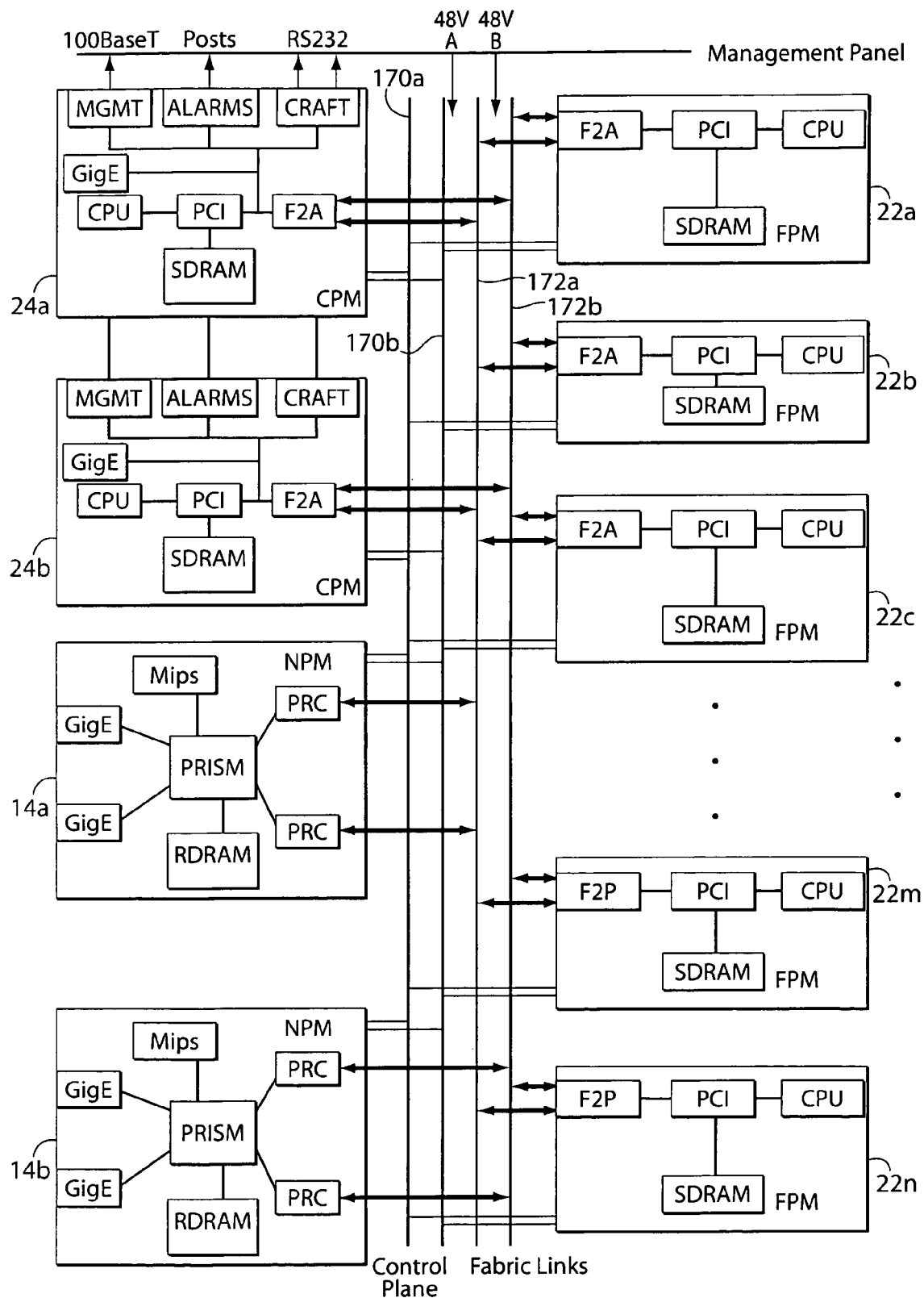
FIG. 4 is a diagram of a redundant architecture for a system according to FIG. 2.

FIG. 4 illustrates an alternate representation of the FIG. 2 system that implements a dual redundant architecture. In the FIG. 4 embodiment of a redundant architecture, there are two NPMs 14a, 14b, two CPMs 24a, 24b, and ten FPMs 22a-22n that reside in a fourteen rack chassis. In the FIG. 4 system, eight FPMs 22 are provided for typical apparatus 12 operation, with two FPMs 22 provided as alternates in the case of failure of up to two of the operational eight FPMs 22. As FIG. 4 indicates, redundant internal switched 100 Mbyte/second (100Base-T) Ethernet control planes 170a, 170b, provide connections between each of the NPMs 14a, 14b, CPMs 24a, 24b, and FPMs 22a-22n. The illustrated system also includes dual fabric links 172a, 172b, wherein each FPM 22a-22n and CPM 24a, 24b connect to each fabric link 172a, 172b, while the first NPM 14a connects to the first fabric link 172b, and the second NPM 14b connects to the second fabric link 172b to allow each NPM 14a, 14b to operate independently of the other.

Additionally, as indicated in FIG. 4, the FIG. 4 NPMs 14a, 14b maintain two Gigabit Ethernet connections to the network, wherein one of the connections can be to a subscriber including a subscriber network, etc., while the other connection can be to the internet core. Alternately, the illustrated CPMs 24a, 24b maintain a Gigabit Ethernet connection to communicate with a remote storage device illustrated as the data center 32 of FIG. 2.

Figure 5:
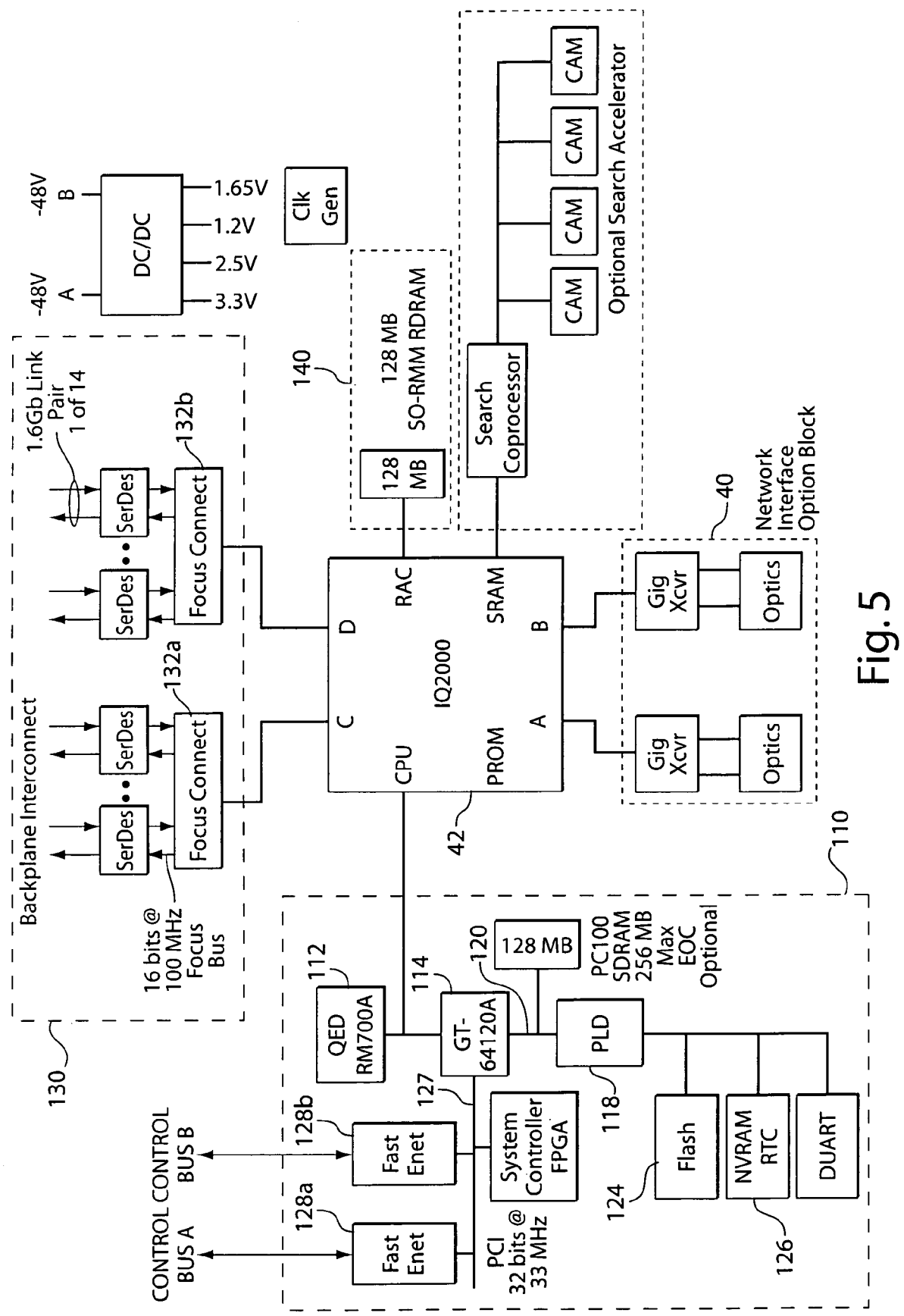
FIG. 5 is a schematic of a Network Processor Module (NPM) for the systems of FIGS. 2 and 4.

FIG. 5 shows a schematic block diagram of an illustrative NPM 14 according to FIGS. 2 and 4. As indicated in FIGS. 2 and 4, according to the invention, the apparatus or switch 12 can include one or more NPMs 14, and when more than one NPM 14 is utilized, the NPMs 14 may be configured for redundant or complementary operation.

A NPM 14 can include a modular and optional subsystem illustrated in FIG. 5 as a network interface subsystem 40. This subsystem 40 physically connects the switch 12 and a network, thereby providing a data flow between the switch 12 and the network. The NPM 14 also includes a Network Processor 42 that connects to the network interface subsystem 40. The Network Processor 42 can be, for example, an IQ2000 Network Processor, and those with ordinary skill in the art will recognize this example as an illustration and not a limitation, wherein any like device performing the functions as described herein may be similarly substituted. Additionally, a second processor can be co-located within the NPM architecture without departing from the scope of the invention. In the case of the illustrated IQ2000 Network Processor 42, the network interface system 40 can connect to ports A and B of the Network Processor 42 using a FOCUS bus, wherein such ports shall hereinafter be referred to as FOCUS ports A and B, and wherein two remaining FOCUS ports labeled C and D are available on the Network Processor 42.

The network interface subsystem 40 can be a changeable component of the NPM architecture, wherein the different options can be different Printed Circuit Board (PCB) designs or pluggable option boards, however, those with ordinary skill in the art will recognize that such methods of implementing the network interface subsystem 40 are merely illustrative and the invention herein is not limited to such techniques.

Figure 6A:
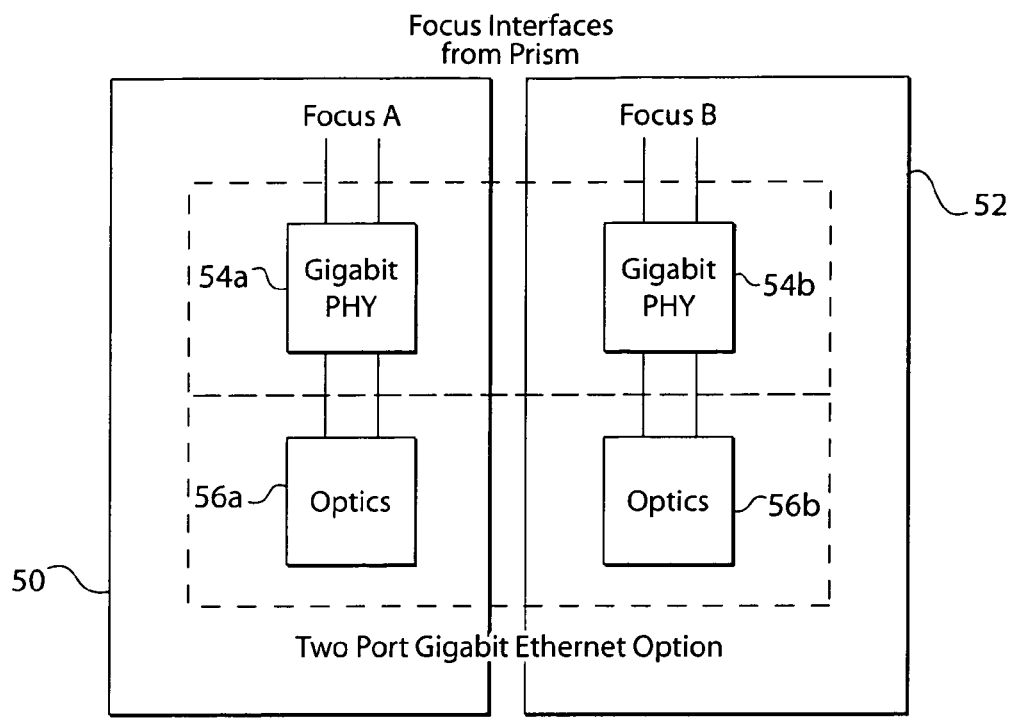
FIGS. 6A, 6B, 6C, 6D, 6E, and 6F detail embodiments of a network interface for the NPM of FIG. 5.

For example, FIGS. 6A through 6F provide various illustrative network interface subsystem 40 options for the FIG. 5 NPM 14. Referring to FIG. 6A, the two Gigabit Ethernet interfaces 50, 52 to the FIG. 5 Network Processor 42 are supported through the Network Processor's 42 two embedded Gigabit Ethernet Media Access Control devices (MACs). In the FIG. 6A embodiment of a network interface subsystem 40, the only external devices necessary for Gigabit Ethernet operation include the Gigabit Ethernet physical layer device (PHY) 54a, 54b and optical interfaces 56a, 56b. In the illustrated embodiment, a first optical interface 56a can couple to a subscriber's network equipment, while a second optical interface 56b can couple to the internet core.

Figure 6B:
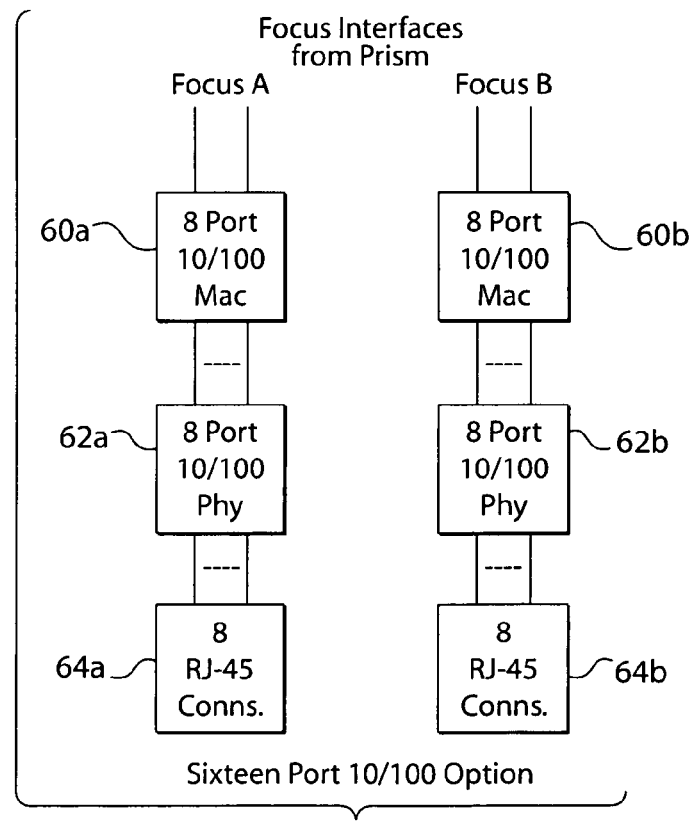

Referring now to FIG. 6B, there is an illustrative configuration for the FIG. 5 NPM 14 wherein FOCUS ports A and B can support up to eight 10/100 Ethernet ports through an external octal 10/100 MAC 60a, 60b. In FIG. 6B, the two external eight port 10/100 MACs 60a, 60b couple to the FOCUS ports and to two external eight port 10/100 PHY devices 62a, 62b. The PHY devices respectively couple to eight RJ-45 connections 64a, 64b. In the FIG. 6B configuration, one set of eight RJ-45 ports 64a can be dedicated to the subscriber's network, while the remaining eight RJ-45 ports 64b can couple to the internet core. In one embodiment, the architecture of FIG. 6B can allow software or firmware to configure the ports as independent data streams such that data received on a subscriber's port can be returned on a internet port.

Figure 6C:
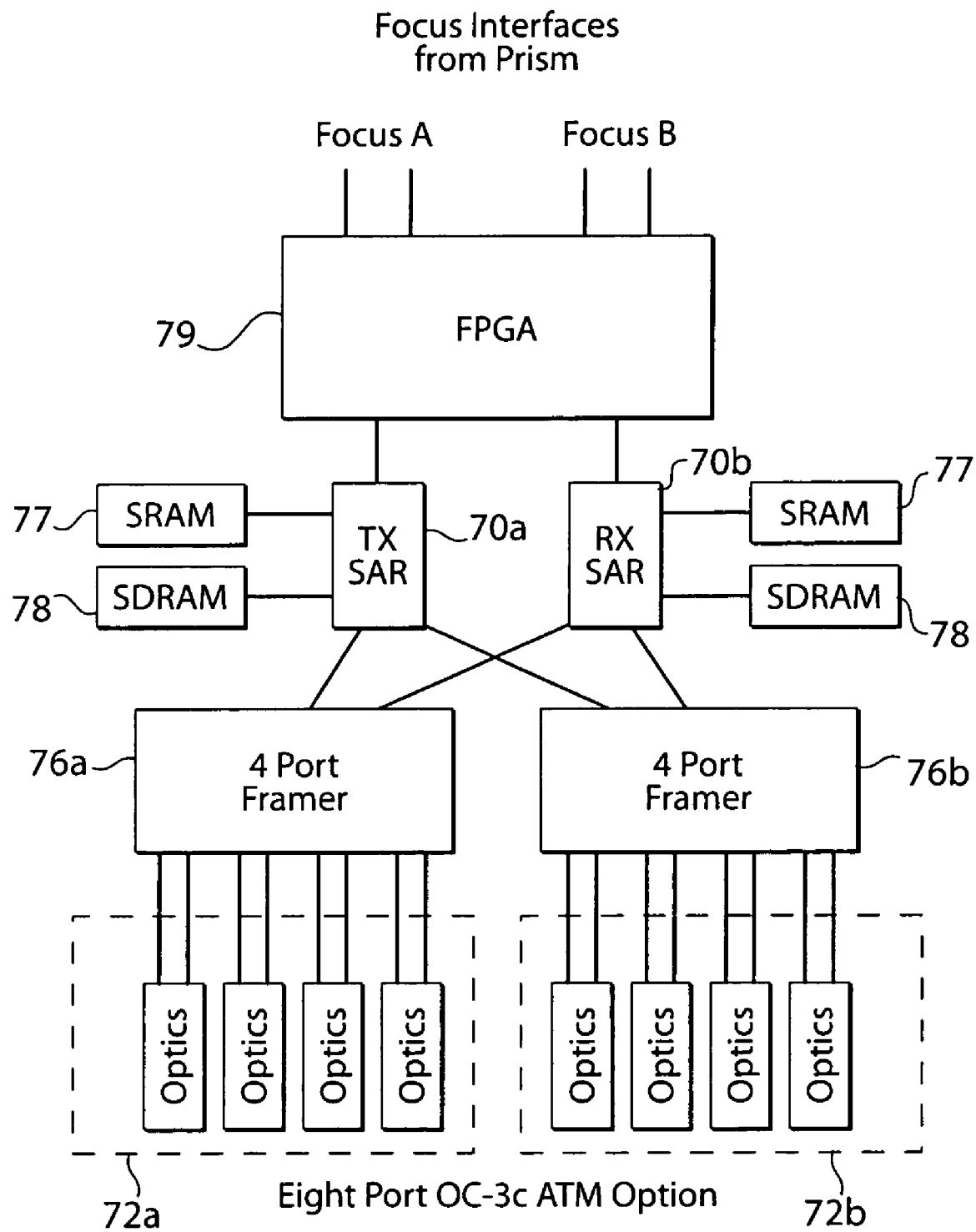

Referring now to FIG. 6C there is a network interface subsystem 40 configuration for the illustrated NPM 14 of FIG. 5, wherein the switch 12 can receive ATM cells with the cooperation of a Segmentation and Reassembly device (SAR) 70a, 70b connected to the A and B FOCUS ports. In the configuration of FIG. 6C wherein OC-3c ATM operation is illustrated, four optical interfaces 72a provide the subscriber interface, while four optical interfaces 72b provide the internet core interface. The respective subscriber and internet optical interfaces 72a, 72b couple to a four port framer 76a, 76b that provides input to a Transmission SAR 70a (TX, "to" the switch 12), or receives output from a Receiver SAR 70b (RX, "from" the switch 12). In the illustrated configuration, the SARs 70a, 70b utilize a 32-bit SRAM 77 and a 64-bit SDRAM 78, although such an embodiment is merely for illustration. In the illustrated system of FIG. 6C, the SAR UTOPIA ports interface to the FOCUS A and B ports through a Field Programmable Gate Array (FPGA) 79. Those with ordinary skill in the art will recognize that the network interface subsystem of FIG. 6C, as with the other diagrams provided herein, is merely provided for illustration and not intended to limit the scope of the invention; therefore, components may be otherwise substituted to perform the same functionality, wherein for example, a single SAR capable of transmission and receiving may be substituted for the two SARs 70a, 70b depicted in the illustration of FIG. 6C.

Figure 6D:
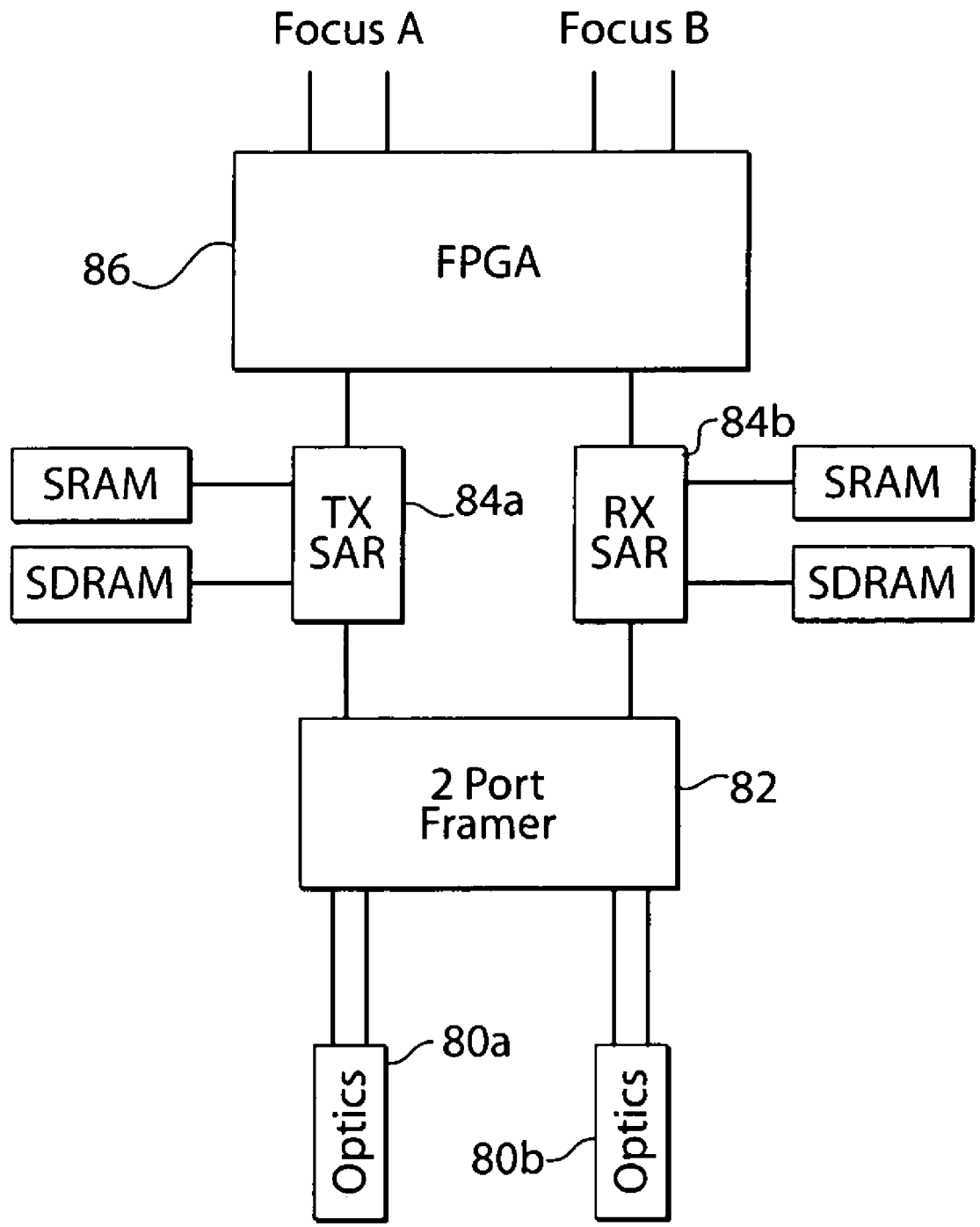

Referring now to FIG. 6D, there is a network interface subsystem 40 configuration for the illustrated NPM 14 of FIG. 4, wherein OC-12c ATM operation may be enabled. In the illustrated system, one OC-12c optical interface 80a can couple to the subscribers, while a second OC-12c optical interface 80b can couple to the internet core. In contrast to FIG. 6C, FIG. 5D illustrates only a two port framer 82 that thereafter interfaces to the TX and RX SARs 84a, 84b, FPGA 86, and the respective FOCUS ports of the Network Processor 42.

Figure 6E:
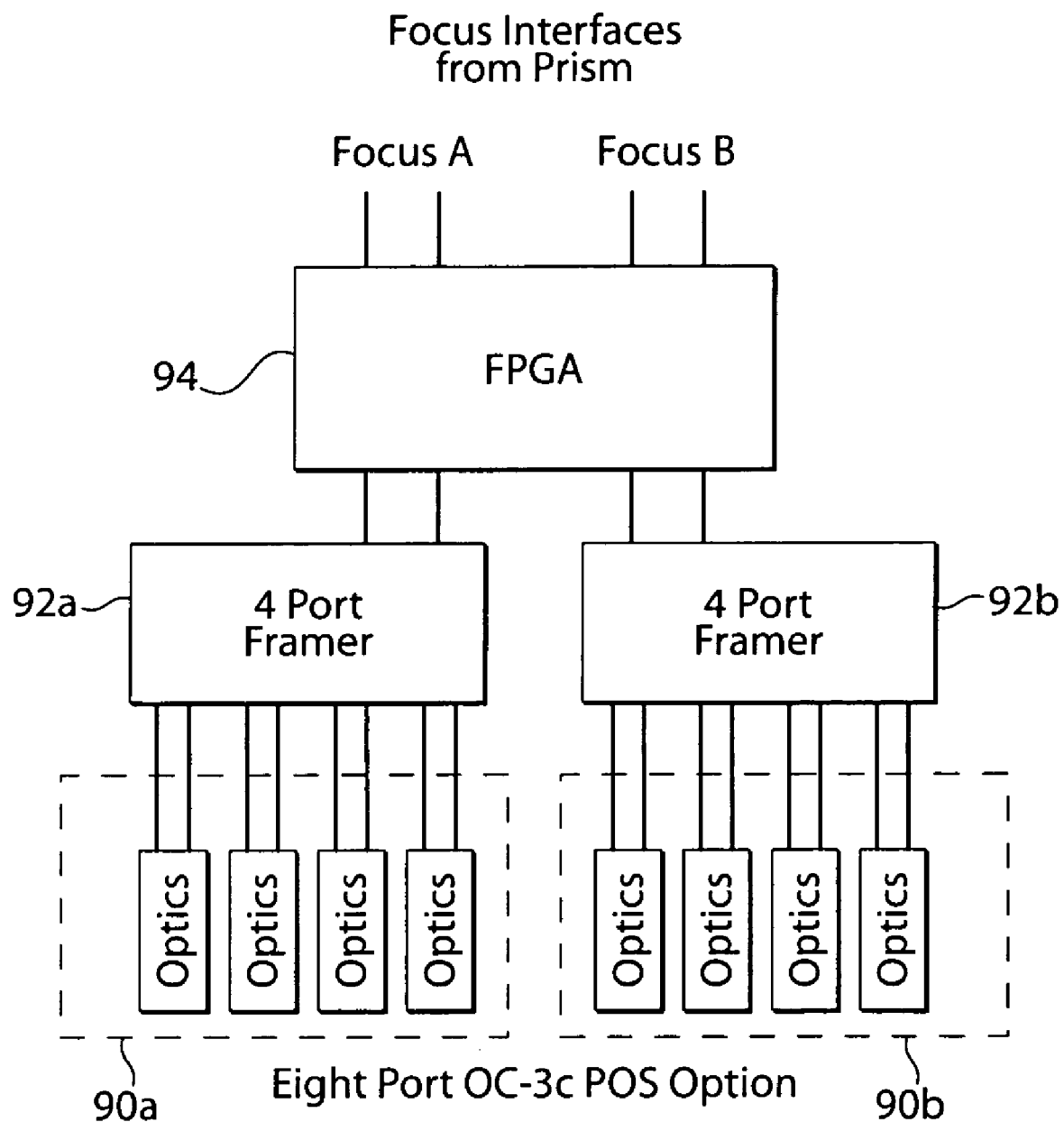

Referring now to FIG. 6E, there is an OC-3C Packet Over SONET (POS) configuration for the network interface subsystem 40 of FIG. 5. In the illustrated configuration of FIG. 6E, four optical interfaces 90a can interface to the subscriber, while four optical interfaces 90b can be dedicated to the internet core. The optical interfaces 90a, 90b respectively couple to a four port framer 92a, 92b that interfaces to the A and B FOCUS ports through a FPGA 94. Those with ordinary skill in the art will recognize that because PPP (Point-to-Point Protocol) encapsulated packets are inserted into the SONET Payload Envelope (SPE), all POS links are concatenated, and the FPGA 94 utilized in FIG. 6E may therefore be similar to the FPGA 86 of FIG. 6D.

Figure 6F:
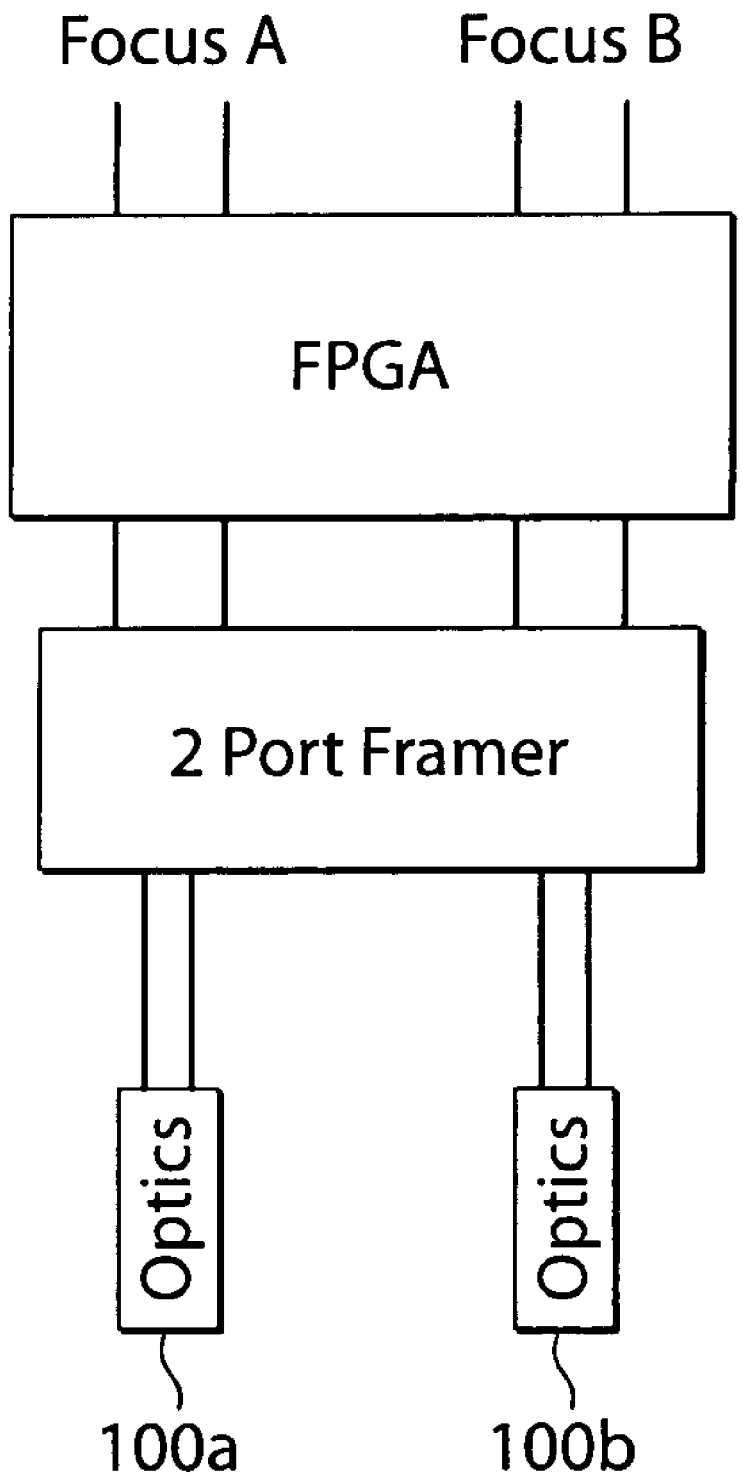

Referring to FIG. 6F, there is a configuration of the network interface subsystem 40 of FIG. 5 for a two port OC-12c POS application. In the illustrated system, one optical interface 100a can couple to the subscriber, and another 100b can couple to the internet core. The FIG. 6F optical interfaces 100a, 100b couple to a two port framer 102 that interfaces to a FPGA 104 for connection to the A and B FOCUS ports.

Referring back to FIG. 5, the illustrated Network Processor 42 also connects to a CPU subsystem 110 that includes a MIPS processor 112 such as a QED RM700A 400 MHz MIPS processor, a system controller/PCI bridge 114 such as the Galileo GT64120A system controller/PC bridge, local SDRAM 116, and a Programmable Logic Device (PLD) 118. In the illustrated system, the PLD 118 makes accessible the board specific control registers and miscellaneous devices. As illustrated, the PLD 118 is connected to a local high-speed bus on the GT64120A 114 with a local SDRAM 116, and acts as a buffer between the local high-speed bus 120 and a lower speed peripheral bus 122 that has boot PROM Flash 124 and non-volatile RAM (NVRAM) 126 for semi-permanent storage of settings and parameters, and for providing a real-time clock for time of day and date. The FIG. 5 PCI bus 127 connected to the PCI bridge also includes two Fast Ethernet MACs 128a, 128b, such as the Intel GD82559ER 100 Mbit MAC that includes an integrated PHY, to provide redundant connections between the NPM 14 and CPM 24 via a primary and secondary 100Base-T Ethernet channel. The illustrated MACs 128a, 128b reside on the PCI bus and perform Direct Memory Access (DMA) transfers between the PCI internal buffers and the defined buffer descriptors within the local MIPS memory 112. The MACs 128a, 128b can support an unlimited burst size and can be limited by PCI bridge performance. In an embodiment, flow control can be utilized in a control plane application to avoid unnecessary packet loss. The illustrated GT64120A 114 allows the CPU 112 and other local bus masters to access the PCI memory and/or device buses.

The FIG. 5 NPM 14 also includes a switch fabric subsystem 130 that provides high-speed, non-blocking data connections between the NPM 14 and the other modules within the switch 12. The connections include two links to another, redundant or complementary NPM 14 and a link to each CPM 24. The illustrated NPM's 14 portion of the fabric includes two Focus Connect devices 132a, 132b, wherein one Focus Connect device 132a is connected to the IQ2000 42 port C using a FOCUS Bus, while another Focus Connect device 132b is connected to port D.

Figure 7:
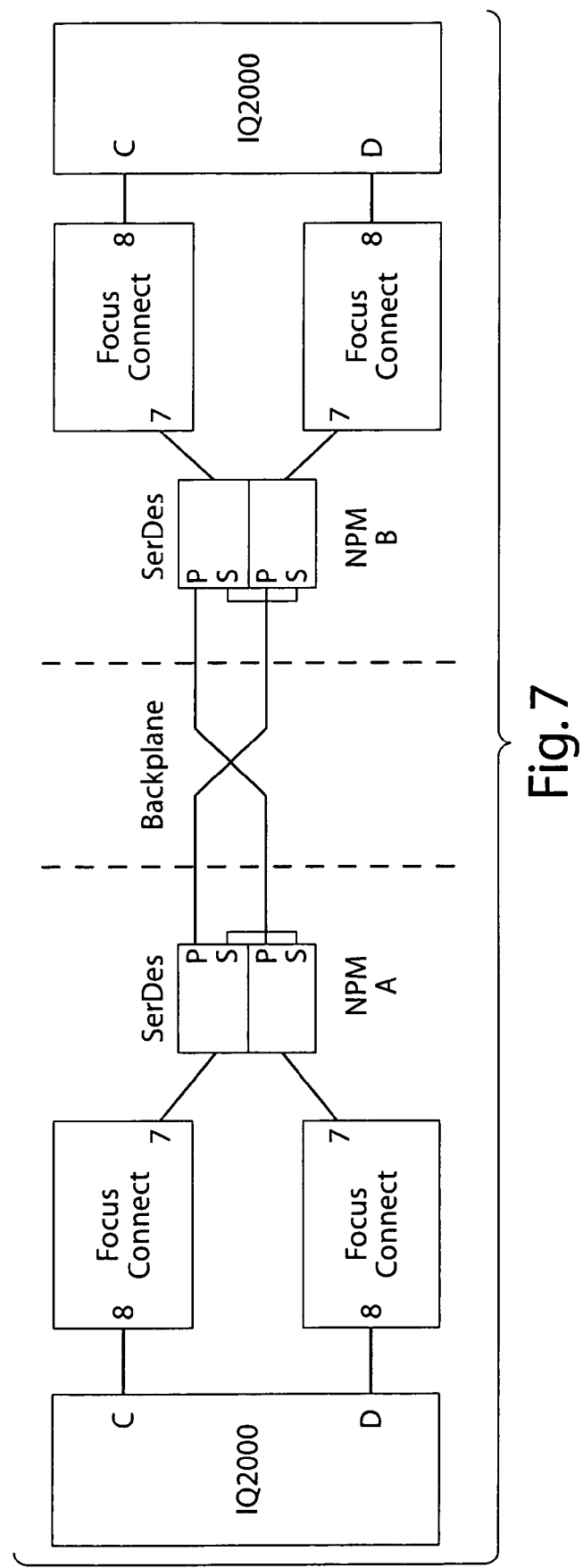
FIG. 7 illustrates a crossover on the backplane within the illustrated NPM of FIG. 5.

In the illustrated system, the ports on the sixteen bit FOCUS bus on the Focus Connect devices 132a, 132b, with the exception of local port eight, are attached to a Cypress Quad Hotlink Gigabit transceiver 134 that is a serial to deserial (SerDes) device 136 having dual redundant I/O capabilities and configured for dual channel bonded mode. The dual channel bonded mode couples two channels together in a sixteen-bit channel, wherein there can be two such sixteen-bit channels per device. Referring now FIG. 7, the dual redundant serial I/O capabilities, in cooperation with a crossover on the backplane, allow any slot to be connected to any other slot such that a packet or a data route vector modification is not necessary when only one NPM 14 is present. The FIG. 5 Serdes devices 136 convert incoming serial stream data from the backplane, to parallel data for forwarding to the Focus Connect devices 132a, 132b. Similarly, the Serdes 136 converts parallel data from the Focus Connect device 132a, 132b to serial data before placing the data on the backplane.

For example, with the illustrated system of FIG. 4 a Focus Connect device 132a, 132b is connected to the IQ2000 FOCUS C and D ports and wherein the Focus Connect devices 132a, 132b maintain eight ports each, in the illustrative system wherein there is a fourteen slot chassis and there are ten slots for FPMs 22a-22n, two slots for NPMs 14a, 14b, and two slots for CPMs 24a, 24b, the Focus Connect device ports can be configured as shown in Tables 1 and 2:

TABLE 1

Focus Connect device connected to IQ2000 FOCUS Port C (132a)

| Focus Connect Port | Connected Module |
| --- | --- |
| 1 | FPM, slot 1 |
| 2 | FPM, slot 2 |
| 3 | FPM, slot 3 |
| 4 | FPM, slot 4 |
| 5 | FPM, slot 5 |
| 6 | CPM, slot 1 |
| 7 | Other NPM, Focus Connect Port D |
| 8 | Local IQ2000, Port C |

TABLE 2

Focus Connect device connected to IQ2000 FOCUS Port D (132b)

| Focus Connect Port | Connected Module |
| --- | --- |
| 1 | FPM, slot 6 |
| 2 | FPM, slot 7 |
| 3 | FPM, slot 8 |
| 4 | FPM, slot 9 |
| 5 | FPM, slot 10 |
| 6 | CPM, slot 2 |
| 7 | Other NPM, Focus Connect on Port C |
| 8 | Local IQ2000, Port D |

As Tables 1 and 2 indicate, using the FIG. 4 NPM 14 in a redundant system as illustrated in FIGS. 1 and 3, the dual NPMs 14a, 14b can access all FPMs 22a-22n and each CPM 24a, 24b, and vice-versa.

The fourth major subsystem of the FIG. 5 NPM 14 is a memory subsystem 140. The FIG. 5 memory subsystem is a single RAMbus channel for packet buffer storage and flow lookup table space. In the illustrated embodiment, the memory subsystem 140 includes a search processor 142 and several content addressable memories 144, although those with ordinary skill in the art will recognize that the invention herein is not limited to the memory subsystem 140 or the components thereof.

Referring back to FIG. 5, data received by the NPM 14 can be forwarded to the IQ2000 42 that can include instructions for recognizing packets or data flows. For example, CPU or processor instructions can implement or otherwise utilize a hash table to identify services or processing for an identified packet or flow, wherein the packet or flow can subsequently be forwarded to a FPM 22, for example, in accordance with the service or processing. Alternately, unidentified packets can be forwarded to the MIPS 112 that can include instructions for identifying the packet or flow and associated processing or services. In an embodiment, packets unable to be identified by the MIPS 112 can be forwarded by the MIPS 112 to the CPM 24 that can also include instructions for identifying packets or flows. Identification information from either the CPM 24 or MIPS 112 can be returned to the IQ2000 42 and the hash table can be updated accordingly with the identification information.

Figure 8:
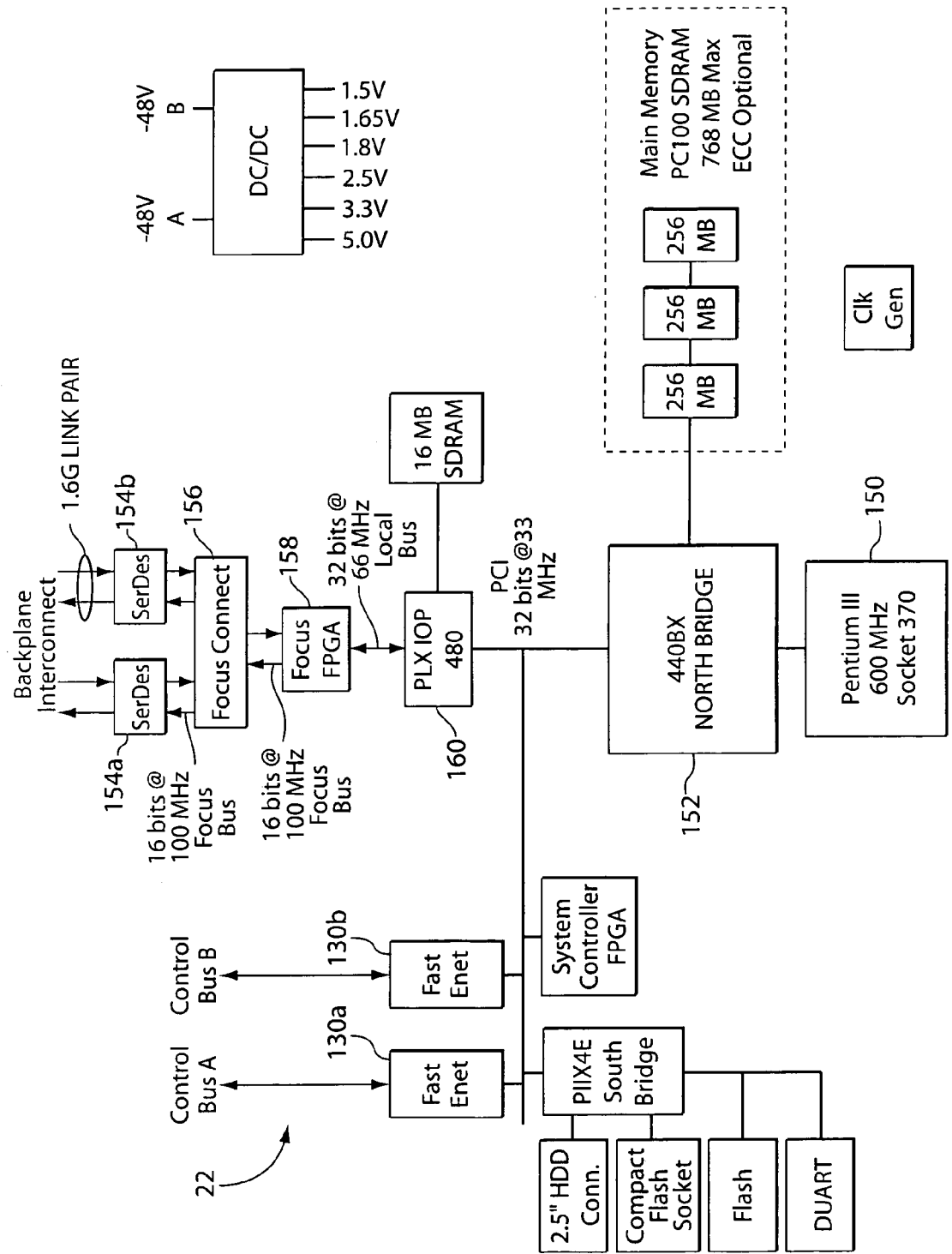
FIG. 8 is an architectural block diagram of a Flow Processor Module (FPM) for the embodiments of FIGS. 2 and 4.

Referring now to FIG. 8, there is a basic schematic block diagram of a FPM 22 for the system illustrated in FIGS. 1-3. In the embodiment of FIG. 8, the FPM 22 is based upon Intel's 440BX AGPset, with a majority of the FPM functionality similar to a personal computer (PC). The illustrated FPM 22 can therefore be, viewed as having four main sections that include a processor or CPU 120, a 440BX AGPset 122, a FOCUS interface, and peripherals. In the illustrated system of FIGS. 2 and 4, the FPMs 22 are identically designed, although those with ordinary skill in the art will recognize that the methods and systems disclosed herein may include differing FPM designs.

Referring to FIG. 8, the illustrated FPM 22 embodiment supports a single socket 370 Intel Pentium III CPU 150 with a 100 Megahertz processor system bus (PSB), although such processor is merely for illustration and not limitation, and those with ordinary skill in the art will recognize that the invention disclosed herein is not limited by the CPU selection or processor component. Similarly, those with ordinary skill in the art will recognize that multiple processors 150 can be incorporated within the FPM architecture without departing from the scope of the invention. The representative FPM 22 also includes a 440BX Accelerated Graphics Port (AGPset) 152 that provides host/processor support for the CPU 150.

Data packets moving into and out of the FPM 22 in the illustrated system use a 16-bit wide 100 Megahertz bus called the FOCUS bus, and in the illustrated embodiment, a full-duplex FOCUS bus attaches to every FPM 22 from each NPM 14, wherein in the illustrated embodiment of dual redundant NPMs 14*a*, 14*b*, every FPM 22 communicates with two NPMs 14*a*, 14*b*. As indicated previously, the FOCUS bus signal is serialized on the NPM 14*a*, 14*b* before it is placed on the backplane, to improve signal integrity and reduce the number of traces. As illustrated, deserializers 154*a*, 154*b* on the FPM 22 convert the signal from the backplane to a bus and the bus connects the deserializers 154*a*, 154*b* to a Focus Connect 156 that interfaces through a FPGA 158 and Input Output Processor 160 to the 440BX AGPset 152. The illustrated PRC is an eight-way FOCUS switch that allows the FPM 22 to properly direct packets to the correct NPM 14.

The FIG. 8 FPM 22 also maintains peripherals including control plane interfaces, mass storage devices, and serial interfaces. In the illustrated FPM 22, the control plane provides a dedicated path for communicating with the FPM 22 through two fast Ethernet controllers 130*a*, 130*b* that interface the AGP 152 to the redundant control plane. As indicated in FIGS. 2 and 4, it is typically the CPM 24*a*, 24*b* that communicates with the FPM 22 via the control plane. In the illustrated embodiment, the fast Ethernet controllers 130*a*, 130*b* connect to control planes that are switched 100 Megabits/second Ethernet networks that terminate at the two CPMs 24.

The illustrated FPM 22 may also support different types of mass storage devices that can include, for example, a M-Systems DiskOnChip (DOC), a 2.5 inch disk drive, NVRAM for semi-permanent storage of settings and parameters, etc.

Figure 9:
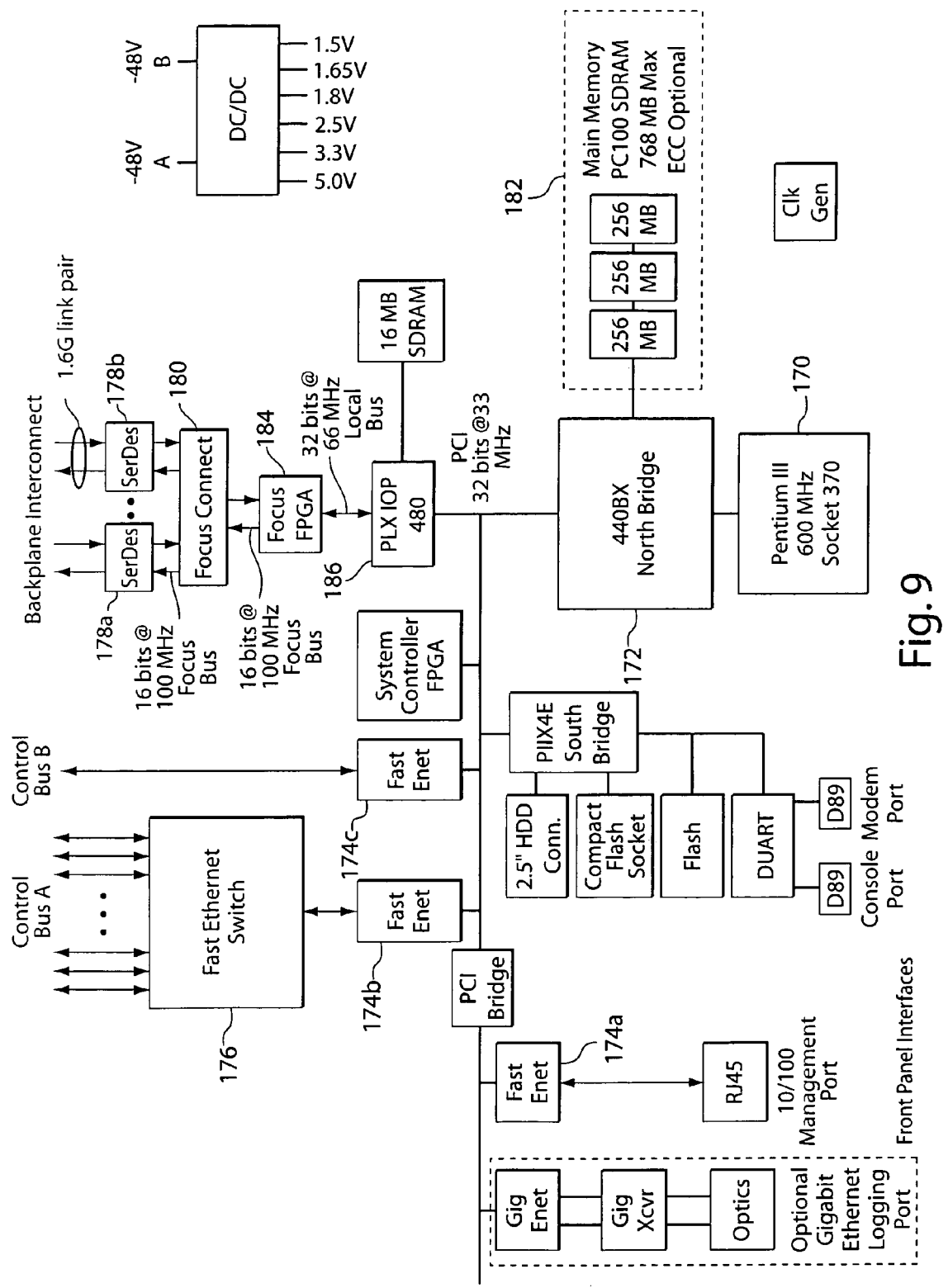
FIG. 9 is a block diagram of an illustrative Control Processor Module (CPM) architecture according to the representative systems of FIGS. 2 and 4; and, FIG. 10 is a block diagram illustrating a logic flow for flow scheduling for the methods and systems of FIGS. 2-4.

Referring now to FIG. 9, there is an illustration of a sample CPM 24 as presented in the systems of FIGS. 2 and 4. As indicated previously, the CPM 24 performs generic, switch-wide functions and is connected to the other switch components through a data interface that, in the illustrated embodiment, is identical to the data interface of FIG. 7 for the FPM 22. Those with ordinary skill in the art will recognize that the common data interfaces for the FPM 22 and CPM 24 modules are merely for convenience and do not limit the scope of the invention.

As discussed earlier, in the illustrated embodiment, the control planes terminate at a CPM 24, wherein the illustrative control planes are dual redundant, private, switched 100 Megabit Ethernet. The switching elements are housed on the CPM 24, and therefore all point-to-point connections between other modules and a CPM 24 are maintained through the backplane connector.

Additionally, the CPM 24 controls the switch 12 boot process and manages the removal and insertion of modules into the switch 12 while the switch 12 is operational.

In the illustrated CPM 24 of FIG. 9, the main CPU 170 is a Pentium III processor, although the invention herein is not so limited, and any processor or CPU or device capable of performing the functions described herein may be substituted without departing from the scope of the invention, wherein multiple processors or CPUs may additionally be utilized. In the illustrated CPM 24, a 440BX-Accelerated Graphics Port (AGPset) 172 provides host/processor support for the CPU 170. The FIG. 9 AGP 172 supports a PCI interface to connect to miscellaneous hardware devices.

Three fast Ethernet controllers 174*a*, 174*b*, 174*c* also reside on the PCI bus of the 440 BX 172. One of these three fast Ethernet controllers 174*a* provides external communications and multiplexes with the fast Ethernet on the other CPM 24. The other two fast Ethernet controllers 174*b*, 174*c* provide dedicated communications paths to the NPMs 14 and FPMs 22. In the illustrated system of FIG. 9, the fast Ethernet controller is an Intel 82559ER, fully integrated 10BASE-T/100BASE-TX LAN solution combining the MAC and PHY into a single component, although such embodiment is merely provided as an illustration. In the illustrated system, the fast Ethernet controllers 174*b*, 174*c* interface to an Ethernet switch 176 that provides fourteen dedicated communication paths to the control plane for up to ten FPMs 22 and two NPMs 14.

Data packets move into and out of the illustrated CPM 24 using a sixteen-bit wide 100 MHz FOCUS bus. In the illustrated system, there is one full-duplex-FOCUS bus coupling each CPM 24 to each NPM 14, wherein for the illustrated system of FIGS. 2 and 4 having dual redundant NPMs 14*a*, 14*b*, each CPM 24 couples to two NPMs 14*a*, 14*b*. Serdes devices 178*a*, 178*b* convert incoming serial stream data from the backplane, to parallel data for forwarding to a Focus Connect device 180. Similarly, the Serdes 178*a*, 178*b* convert parallel data from the Focus Connect 180 to serial data before placing it on the backplane. The illustrated Focus Connect 180 is a switch used by the CPM 24 to direct packets to the correct NPM 14. In the FIG. 9 system, packets are moved into and out of the CPU memory 182 through a FPGA 184 and Input Output Processor 186 that interface the Focus Connect 180 to the AGP 172.

Referring again to the systems of FIGS. 2 and 4, the CPMs 24 coordinate the different components of the switch, including the NPMs and FPMs, and similarly support access to a local storage device 30 that can also be referred to as a local memory device. In one embodiment, the local storage device 30 can store images, configuration files, and databases for executing applications on the FPMs 22. For example, the local device 30 may store subscriber profiles that can be retrieved for use by either the NPM 14 or FPMs 22. In an embodiment, a configuration file for a particular application or subscriber can be retrieved and copied to multiple FPMs 22, for example, thereby providing increased efficiency in a scenario wherein multiple, identically configured FPMs 22 are desired. In such an embodiment, FPMs 22 may be grouped for a subscriber. The local storage device 30 can be any well-known memory component that may be removable or resident on the CPMs 24, including but not limited to a floppy disk, compact disc (CD), digital video device (DVD), etc. In the illustrated system, there is at least one local storage device for each CPM 24. Similarly, in the illustrated system, the local storage device 30 can be divided into several partitions to accommodate and protect certain processor's needs, including the processors on the various FPMs 22. In one embodiment, the local storage device 30 can include two identical disk partitions that allow dynamic software upgrades. In an embodiment, two disk partitions can include identical groups of partitions that can include swap partitions, common partitions for use by all processors, and specific partitions for different module processors (i.e., NPMs, FPMs, CPMs).

The illustrated CPMs 24 can also access a remote storage device 32, wherein such remote storage can store services, database, etc., that may not be efficiently stored in the local memory device 30. The remote storage device 32 can be any compilation of memory components that can be physically or logically partitioned depending upon the application, and those with ordinary skill in the art will recognize that the invention herein is not limited by the actual memory components utilized to create the remote storage device 32.

The FIG. 2 CPMs 24 also couple to at least one management server (MS) module 28. In the illustrated embodiment, the connection is a 100Base-T Ethernet connection. In the FIG. 2 system, the MS 28 can receive and aggregate health and status information from the switch modules 14, 22, 24, wherein the health and status information may be provided to the MS 28 through the CPMs 24. In an embodiment wherein NPMs 14, FPMs 22, and CPMs 24 are redundantly provided, for example, the MS 28 can activate or inactivate a particular apparatus 12 module. In the illustrated embodiments, the MS 28 communicates with the apparatus 12 modules through the CPM 24. In an embodiment, the MS 28 may be a PC, Sun Workstation, or other similarly operational microprocessor controlled device, that can be equipped with microprocessor executable instructions for monitoring and controlling the apparatus 12 modules. In an embodiment, the MS 28 can include an executable that provides a graphical user interface (GUI) for display of apparatus 12 monitoring and control information. In one embodiment, the MS 28 can be a separate device from the CPM 24, while in another embodiment, the MS 28 functionality can be incorporated into the CPM 24, for example, by utilizing a separate processor on the CPM 24 for MS 28 functionality.

In an embodiment, the well-known Linux operating system can be installed on the FPM 22 and CPM 24 processors, thereby providing an open architecture that allows installation and modification of, for example, applications residing on the FPMs 22. In the illustrated systems, the management and control of applications on the switch modules can be performed using the MS 28. In the illustrated embodiments, the MS 28 management can be performed using the CPM 24. Applications such as firewall applications, etc., in the illustrated embodiments can therefore be downloaded, removed, modified, transferred between FPMs 22, etc. using the MS 28.

In an embodiment, the NPMs 14 can execute the well-known VxWorks operating system on the MIPS processor and a small executable on the IQ2000 processor 42. Those with ordinary skill in the art will recognize that the methods and systems disclosed herein are not limited to the choice of operating systems on the various switch modules, and that any operating system allowing an open architecture can be substituted while remaining within the scope of the invention.

Figure 10:
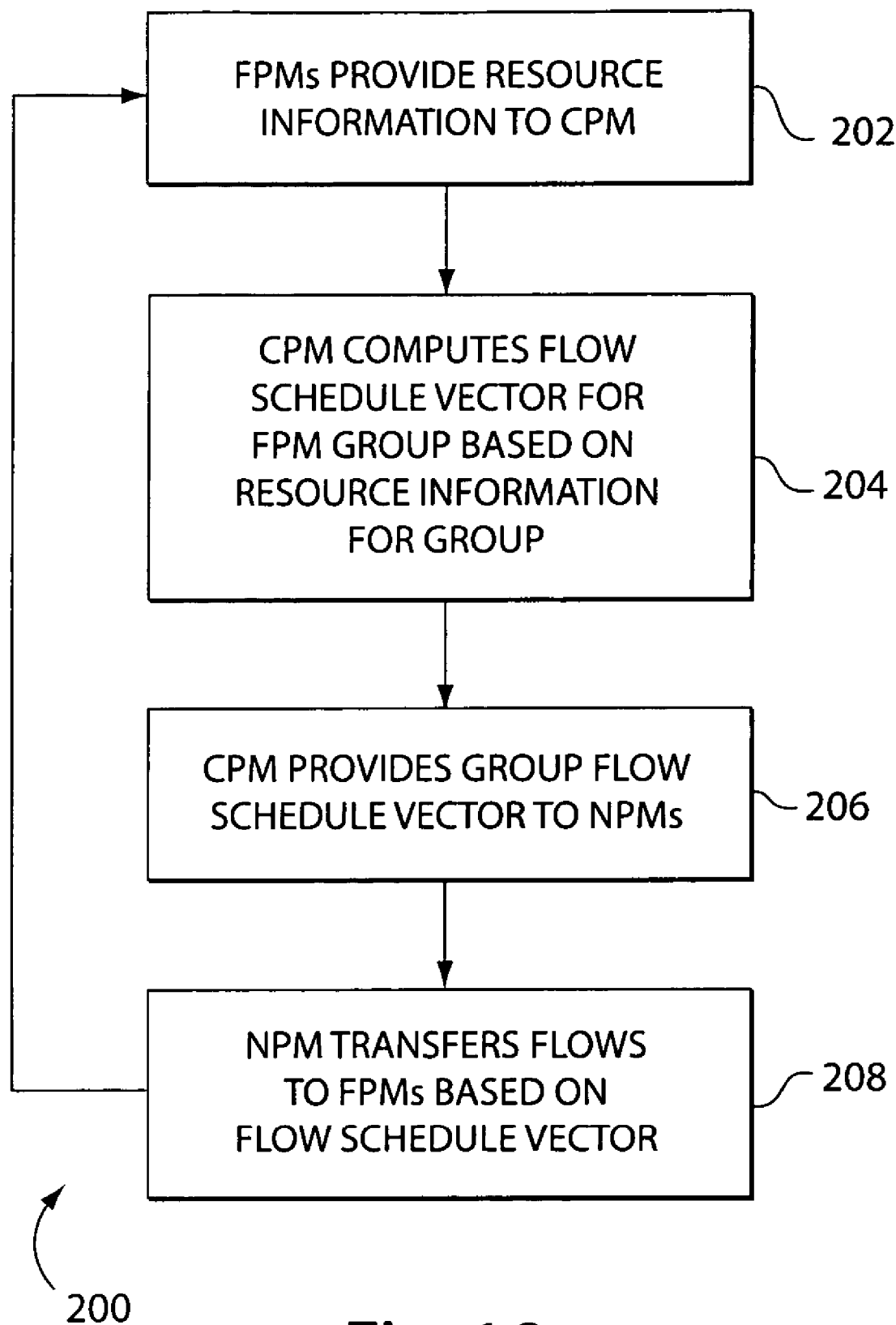

Referring now to FIG. 10, there is an illustrative block diagram of a flow scheduling process 200 for the illustrated systems and methods of FIGS. 2-4. As FIG. 10 indicates, for the illustrated systems, the FPMs 22 can provide resource information 202 to the CPMs 24. The description or definition of resource information can be dependent upon or otherwise defined by the system configuration, and can include any information that can assist in the distribution of flows between NPMs 14 and FPMs 22 according to a predefined or otherwise established flow scheduling criteria. In an embodiment wherein it is desired that flows be directed to FPMs 22 to optimize FPM 22 utilization, for example, resource information can include intrinsic FPM data such as FPM CPU utilization, FPM memory utilization, FPM packet loss, FPM queue length or buffer occupation, etc., and those with ordinary skill in the art will recognize that such metric or resource information is provided merely for illustration and not limitation, and other resource information can be provided to the CPMs 24 from the FPMs 22 without departing from the scope of the invention. Similarly, it is not necessary that any of the above-mentioned illustrative resource information be provided in any given embodiment of the methods and systems disclosed herein.

In the illustrated embodiments, FPMs 22 can be understood to belong to a FPM group, where a FPM group includes FPMs 22 that are configured identically, and hence a given FPM 22 is assigned to a single group. In other embodiments, a given FPM 22 can be assigned to various groups, for example, if groups include FPMs that are capable of processing a particular application. In an embodiment wherein ten FPMs 22 are present and can be referenced by the numerals one through ten, respectively, and FPMs one, four, five, eight, and nine are configured identically, while FPMs two and three are configured identically, and FPMs six, seven, and ten are configured identically, three FPM groups can be defined accordingly. For a system and method according to the illustrated embodiments, resource information from the FPM groups can be provided to the CPM 202 in response to a query request from the CPM 24; or, resource information can be provided to the CPM 24 automatically, for example, at scheduled intervals during which the FPMs 22 are configured to transmit the resource information to the CPM 24. In an embodiment, FPMs 22 from a given group can transfer resource information to the CPM 24 at specified times, while in another embodiment, the transfer of resource information from an individual FPM 22 to CPM 24 may not be group-related or dependent. In an embodiment, the transfer of resource information from FPM 22 to CPM 24 can be simultaneous for all FPMs 22.

In the illustrated systems, for example, a FPM 22 can transmit resource information to the CPM 24 at intervals of one-tenth second, although those with ordinary skill in the art will recognize that such timing is provided merely for illustration, and the invention herein is not limited to the timing or scheduling of resource information transfer between the FPMs 22 and the CPM 24. The illustrated system CPM 24 can be responsible for parsing the FPM 22 resource information according to FPM 22, and then FPM group 204. For example, for the three-FPM group illustration provided previously herein, the CPM 24 can be configured to identify the FPM 22 from which resource information is arriving, and also identify the group to which that FPM 22 belongs. Those with ordinary skill in the art will recognize that there are different methods for identifying the source of a data message or transfer, including for example, inclusion of identification in the message header, CRC, etc., and the invention herein is not limited to the technique or method by which the resource information can be associated to a FPM 22.

The illustrated CPM 24 can arrange information from the FPMs 22 according to FPM group, and utilize such information to compute a flow scheduling vector for the FPM group 204. Although the FPMs 22 can provide resource information to the CPM 24 at given intervals, the CPM flow schedule computation may not be coincidental with such reception of information. In one embodiment, the CPM 24 can update a flow schedule vector whenever FPM information is obtained; however, in other embodiments, the CPM 24 may average multiple updates from a given FPM 22 or FPM group, before updating a flow schedule vector. For example, the CPM 24 can be configured to compute a new flow schedule vector for a given group at specified time intervals, or at specified FPM update intervals, etc., wherein the invention herein is not limited by the timing of the CPM flow schedule vector computation.

In an embodiment, the CPM flow schedule vector computation interval can be a function of the applications residing within a given FPM group. For example, if the CPM recognizes that a FPM group configuration includes applications that require a given time to complete, the flow schedule vector computation can be performed based upon such information. In a system wherein FPM group flow schedule vector computation is application dependent, FPM flow schedule vectors for different FPM groups can be computed independent of the other FPM groups.

In one embodiment, flow schedule vectors can be computed based on historic intrinsic data from the FPMs. In an embodiment, this historical information can be incorporated into the flow schedule vector using a filter.

A computed flow schedule vector for a given FPM group can be of varying length. For example, consider a FPM group having three FPMs 22 that can be referred to as five, six, and seven. During a given interval, the CPM 24 can determine that FPMs five and seven are completely loaded, while FPM six is not. The vector for the FPM group can be, for example, in this instance, one value that identifies FPM six, and this vector may remain the same, for example, until FPMs five and seven indicate a decreased loading. In another illustration for this same FPM group, wherein forty percent of the flows should be processed by FPM five, forty percent by FPM six, and twenty percent by FPM seven, the flow scheduling vector can be five values that can be arranged in vector notation as: [FPM five; FPM six; FPM five; FPM six; FPM seven].

Referring again to FIG. 10, after the CPM 24 computes a flow schedule vector for a given FPM group, the CPM can transfer 206 the flow schedule vector to the NPMs 14. Depending upon the CPM configuration, the transfer of updated flow schedule vector from CPM 24 to NPM 14 may not be at the same rate as the CPM flow schedule vector computation. In some embodiments, the transfer of flow schedule vectors from CPM 24 to NPM 14 can be configured for fixed intervals that can vary according to FPM group. In other embodiments, updated flow schedule vectors for all FPM groups can be transferred to the NPMs 14 at the same time. In yet another embodiment, the transfer of a new flow schedule vector from CPM 24 to NPM 14 may only occur based upon a predetermined criteria, for example, that can require a specified difference between an existing flow schedule vector and a newly computed flow schedule vector. Those with ordinary skill in the art will recognize that the methods and systems herein are not limited by the frequency or scheduling of flow schedule vector transfers between a CPM 24 and NPMs 14.

As indicated herein, the NPMs 14 interface to subscribers and/or a network, etc., and can receive flows, identify the application(s) requested by the flow, and also identify which FPMs 22 can process the flow/request. In a system employing the flow scheduling method of FIG. 10, once the NPMs 14 identify which application(s) a received flow is requesting, the NPMs 14 can determine a FPM group to process the flow. In one embodiment, the NPMs 14 can utilize, for example, a hash table to relate a request for an application or service to a particular FPM group and/or flow schedule vector, although those with ordinary skill in the art will recognize that there are many different techniques for associating a flow or request with a processor group, and the invention herein is not limited to any particular technique. The NPMs can also utilize the flow schedule vector for the identified FPM group to determine which FPM 22 within the identified FPM group, should receive the flow/request for processing. In the illustrated systems and methods wherein flow scheduling vectors can be utilized, the NPMs 14 can be configured to direct flows to FPMs 22 according to the flow schedule vector contents, by sequentially assigning flows to FPMs 22 in the FPM order listed in the respective flow schedule vector, while returning to the beginning of a vector when the vector end is reached. Those with ordinary skill in the art will also recognize that a flow schedule vector can include pointers to FPMs, FPM identities, etc, and the invention is not limited by the technique by which a particular FPM is identified by the vector.

Those with ordinary skill in the art will recognize that the FIG. 10 flow chart and associated discussion is also provided merely for illustration and not limitation. For example, although the flow chart discussion began with the description of the resource information transferring from the FPMs 22 to the CPMs 24, one with ordinary skill in the art will recognize that such processing may not be the initial step in the FIG. 10 processing. In an embodiment, initial flow schedule vectors can be provided by the CPMs 24 to the NPMs 14, or alternately, the NPMs 14 can be configured with an initial flow schedule vector for the different FPM groups. The processing illustrated in FIG. 10 can thus be repeated as indicated in a definite or indefinite manner, without particularity for a given "beginning" or "end" of processing.

One advantage of the present invention over the prior art is that a single architecture is disclosed with multiple processors, wherein intrinsic data from the processors can be utilized to generate an accurate flow scheduling vector for distributing flows or data requests amongst the multiple processors.

What has thus been described is a method and system for distributing flows between a multiple processors. The flows can be received from an external source such as a network, by a front-end processor that recognizes the flow and the associated request, and identifies at least one internal applications processor to process the request/flow. The front-end processor utilizes a flow scheduling vector related to the identified applications processor(s), and the flow scheduling vector can be based on intrinsic data from the applications processor(s) that can include CPU utilization, memory utilization, packet loss, and queue length or buffer occupation. In some embodiments, applications processors can be understood to belong to a group, wherein applications processors within a group can be configured identically. A flow schedule vector can be computed for the different applications processor groups. In some embodiments, a control processor can collect the intrinsic applications processor data, compute the flow scheduling vectors, and transfer the flow scheduling vectors to the front-end processor.

Although the present invention has been described relative to a specific embodiment thereof, it is not so limited. Obviously many modifications and variations of the present invention may become apparent in light of the above teachings. For example, although the illustrated systems divided the modules into various components, the functionality of components may be combined into a single module where appropriate, without affecting the invention. Although the methods and systems herein disclosed resource information transferring from the FPMs to the CPMs for computation of flow scheduling vectors for further transfer to the NPMs, the resource information can be transferred to the NPMs for computation of the flow scheduling vectors at the NPMs. Similarly, other processors can be utilized to process the intrinsic resource information and compute the flow scheduling vectors. Although the disclosure herein referred to a "flow schedule vector", such language can be understood as indicating any type of schedule of any form, and it is not necessary that the schedule be in the form of a vector, queue, array, etc., as other forms of scheduling or otherwise conveying order information can be utilized without departing from the scope of the invention.

Many additional changes in the details, materials, steps and arrangement of parts, herein described and illustrated to explain the nature of the invention, may be made by those skilled in the art within the principle and scope of the invention. Accordingly, it will be understood that the invention is not to be limited to the embodiments disclosed herein, may be practiced otherwise than specifically described, and is to be understood from the following claims, that are to be interpreted as broadly as allowed under the law.

What is claimed is:

1. A method for scheduling data flows among processors, comprising,
receiving a request for processing a data flow,
receiving a data flow from a network, the data flow comprising a stream of data packets that contain data, the data including subscriber profile information,
identifying a processor group to process the request by applying a policy to the data, the processor group including at least one processor,
computing a flow schedule for the identified processor group,
consulting the flow schedule associated with the identified processor group, and,
transferring the request for processing the data flow to the at least one processor in the identified processor group based on the flow schedule, the subscriber profile information, and the policy.

2. A method according to claim 1, wherein consulting the flow schedule further comprises consulting a flow schedule vector.

3. A method according to claim 1, wherein transferring the request includes transferring the request based on sequentially moving among processors in the consulted flow schedule.

4. A method according to claim 3, wherein sequentially moving among processors includes returning to the beginning of the consulted flow schedule upon reaching the end of the consulted flow schedule.

5. A method according to claim 1, wherein computing a flow schedule further comprises receiving intrinsic data from the at least one processor in the identified processor group, the intrinsic data comprising packet loss data from the at least one processor.

6. A method according to claim 5, wherein receiving the intrinsic data from the at least one processor further includes receiving intrinsic data at specified intervals.

7. A method according to claim 5, wherein computing a flow schedule further comprises filtering the intrinsic data.

8. A method according to claim 1, further comprising providing processor groups, the processor groups having at least one processor and wherein the processors in a processor group include at least one similar application.

9. A method according to claim 1, further comprising providing processor groups, the processor groups having at least one processor and wherein the processors in a processor group are identically configured.

10. A method according to claim 9, further comprising computing a flow schedule for the processor groups.

11. A method according to claim 1, further comprising providing processor groups wherein the processors in different processor groups include at least one different application.

12. A method according to claim 1, wherein consulting the flow schedule further includes providing an initial flow schedule.

13. A method according to claim 1, wherein identifying a processor group includes identifying an application associated with the request.

14. A method according to claim 1, wherein identifying a processor group includes consulting a hash table.

* * * * *